United States Patent
Cheng et al.

(10) Patent No.: US 11,480,976 B2
(45) Date of Patent: Oct. 25, 2022

(54) RSU BASED VEHICLE MANEUVER SCHEDULING

(71) Applicant: QUALCOMM Incorporated, San Diego, CA (US)

(72) Inventors: Hong Cheng, Bridgewater, NJ (US); Shailesh Patil, San Diego, CA (US); Junyi Li, Chester, NJ (US); Richard Reid Hovey, Branchburg, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 16/679,973

(22) Filed: Nov. 11, 2019

(65) Prior Publication Data

US 2020/0183416 A1 Jun. 11, 2020

Related U.S. Application Data

(60) Provisional application No. 62/776,950, filed on Dec. 7, 2018.

(51) Int. Cl.
| | |
|---|---|
| G05D 1/02 | (2020.01) |
| G05D 1/00 | (2006.01) |
| H04B 7/26 | (2006.01) |
| H04W 4/40 | (2018.01) |
| G08G 1/01 | (2006.01) |
| G07C 5/00 | (2006.01) |
| H04L 67/12 | (2022.01) |
| H04L 12/40 | (2006.01) |
| G08G 1/0967 | (2006.01) |

(52) U.S. Cl.
CPC ......... *G05D 1/0276* (2013.01); *G05D 1/0022* (2013.01); *G07C 5/008* (2013.01); *G08G 1/0116* (2013.01); *G08G 1/096783* (2013.01); *H04B 7/2668* (2013.01); *H04L 12/40006* (2013.01); *H04L 67/12* (2013.01); *H04W 4/40* (2018.02); *H04L 2012/40273* (2013.01)

(58) Field of Classification Search
None
See application file for complete search history.

(56) References Cited

U.S. PATENT DOCUMENTS

| | | |
|---|---|---|
| 2008/0095134 A1 | 4/2008 | Chen et al. |
| 2013/0018572 A1 | 1/2013 | Jang |

(Continued)

FOREIGN PATENT DOCUMENTS

KR   20170036623 A   4/2017

OTHER PUBLICATIONS

International Search Report and Written Opinion—PCT/US2019/060918—ISA/EPO—dated Mar. 9, 2020.

(Continued)

*Primary Examiner* — Thomas S McCormack
(74) *Attorney, Agent, or Firm* — Procopio, Cory, Hargreaves & Savitch LLP

(57) ABSTRACT

The present disclosure provides for centralized, scheduler-based handling for UEs which transmit data to and receive data from a maneuver coordinator based on V2X communication. Once a UE is aware of the maneuver coordinator, the UE may send a request to the maneuver coordinator for maneuver operation scheduling. The maneuver coordinator then schedules and coordinates the UE's operation.

35 Claims, 15 Drawing Sheets

(56) References Cited

U.S. PATENT DOCUMENTS

| | | | |
|---|---|---|---|
| 2017/0192437 A1* | 7/2017 | Bier | G05D 1/0016 |
| 2017/0219369 A1* | 8/2017 | Lei | G08G 1/096716 |
| 2017/0288886 A1* | 10/2017 | Atarius | H04L 65/1063 |
| 2018/0206089 A1* | 7/2018 | Cavalcanti | H04W 48/16 |
| 2018/0227971 A1* | 8/2018 | Yasukawa | H04W 76/14 |

OTHER PUBLICATIONS

ZTE: "Authorization for PCS-based V2V services", 3GPP Draft, R3-160196, 3rd Generation Partnership Project (3GPP), Mobile Competence Centre, 650, Route Des Lucioles, F-06921 Sophia-Antipolis Cedex, France, vol. RAN WG3, No. St. Julian's, Malta, Feb. 15, 2016-Feb. 19, 2016, Feb. 14, 2016 (Feb. 14, 2016), XP051056073, 3 pages, Retrieved from the Internet: URL: http://www.3gpp.org/ftp/Meetings_3GPP_SYNC/RAN3/Docs/. [retrieved on Feb. 14, 2016] Last 3 paragraphs, p. 2.

* cited by examiner

RSU BASED VEHICLE MANEUVER SCHEDULING

CROSS-REFERENCE TO RELATED APPLICATION(S)

This application claims the benefit of U.S. Provisional Application Ser. No. 62/776,950, entitled "RSU BASED VEHICLE MANEUVER SCHEDULING" and filed on Dec. 7, 2018, which is expressly incorporated by reference herein in its entirety.

BACKGROUND

Technical Field

The present disclosure relates generally to communication systems, and more particularly, to vehicle-to-vehicle (V2V), vehicle-to-everything (V2X), or other device-to-device (D2D) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in V2X, V2V, and/or other D2D communication. There exists a need for further improvements in V2X, V2V, and/or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a User Equipment (UE). The apparatus requests a service for maneuver scheduling of a vehicle from a maneuver coordinator wirelessly over a direct communication link between the UE and the maneuver coordinator. The apparatus receives maneuver information from the maneuver coordinator wirelessly over the direct communication link. The apparatus then applies the maneuver information.

In another aspect of the disclosure, a method, a computer-readable medium, and an apparatus are provided for wireless communication at a maneuver coordinator. The apparatus receives a request for a service for maneuver scheduling of a vehicle from at least one UE wirelessly over a direct communication link between each of the at least one UE and the maneuver coordinator. The apparatus determines maneuver information for the at least one UE based on the request. The apparatus transmits the maneuver information wirelessly over the direct communication link to the at least one UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
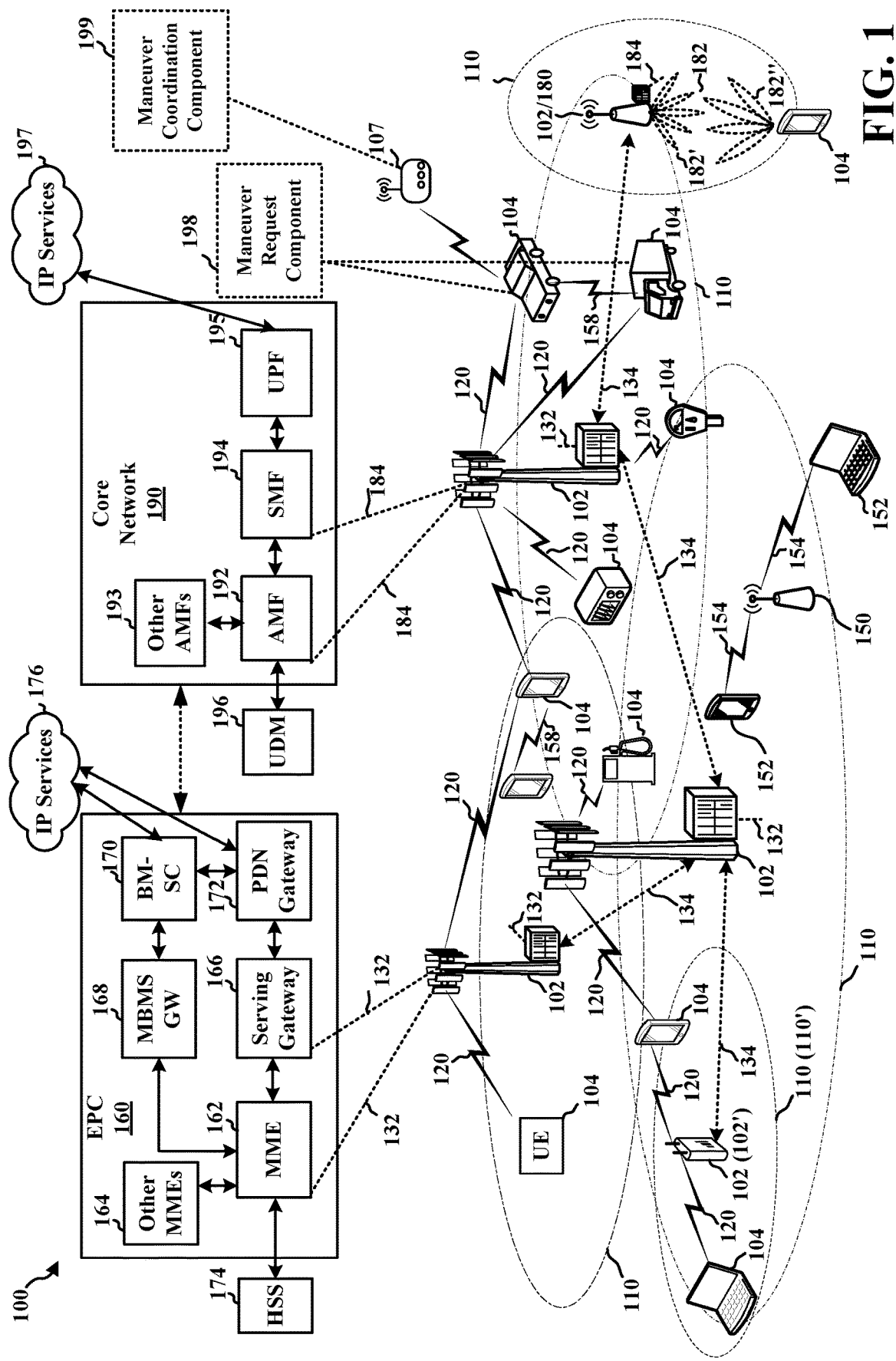
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other.

Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations 180, such as a gNB may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station, e.g., base station 180, may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or other D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Some wireless communication networks may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2V/V2X/V2I or other D2D communication, such as Proximity Services (ProSe), etc. Communication based on V2V, V2X, V2I, and/or D2D may also be transmitted and received by other transmitting and receiving devices, such as Road Side Unit (RSU) 107, etc. Aspects of the communication may be based on PC5 or sidelink communication, e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

Referring again to FIG. 1, in certain aspects, the UE 104 may comprise a maneuver request component 198 configured to send a request to a maneuver coordinator, e.g., a component, function, or service hosted by an RSU 107 or other device, for maneuver operation scheduling. The maneuver coordinator, e.g., RSU 107, may comprise a maneuver coordination component 199 configured to receive maneuver requests from at least one UE 104, to determine coordinated maneuver information for the at least one UE, and to transmit a maneuver command to the at least one requesting UE.

Figure 2:
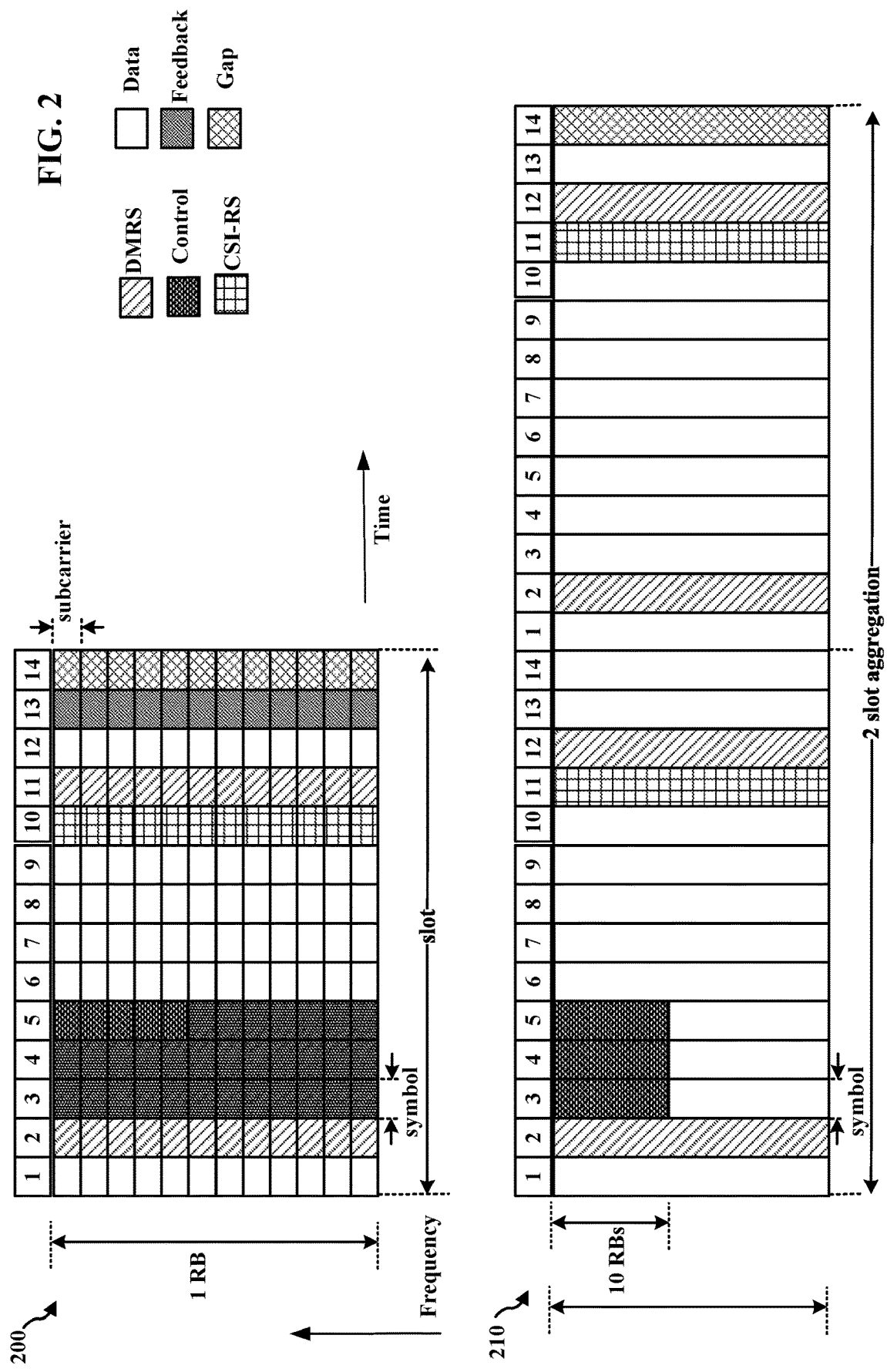
FIG. 2 illustrates example aspects of a sidelink slot structure.

FIG. 2 illustrates example diagrams 200 and 210 illustrating example slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in bursts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slots. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
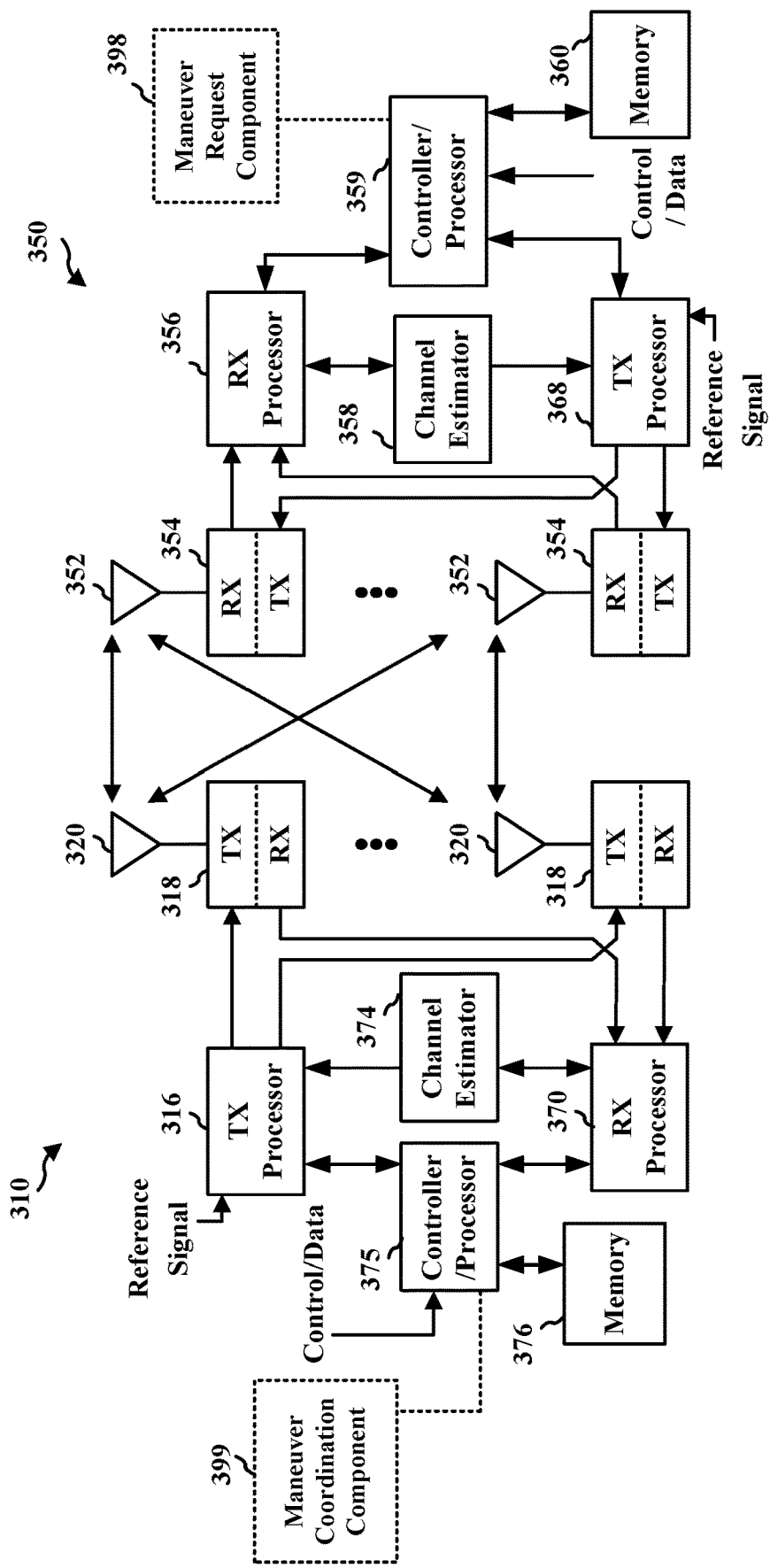
FIG. 3 is a diagram illustrating an example of a first device and a second device involved in wireless communication based, e.g., on V2V, V2X, and/or device-to-device communication.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The device 310 may comprise a UE, an RSU, etc. The receiving device may comprise a UE, an RSU, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

As one example, device 350 may comprise a UE including a maneuver request component 398 configured to send a request to a maneuver coordinator, e.g. RSU 107, for maneuver operation scheduling. Device 310 may comprise a maneuver coordinator, such as RSU 107, including a maneuver coordination component 399 configured to coordinate maneuver(s) for at least one UE and to transmit a maneuver command to the requesting UE(s). As another example, device 310 may comprise the UE and device 350 may comprise the maneuver coordinator. At least one of the TX processor 368, the RX processor 356, or the controller/processor 359 of device 350 or the TX 316, the RX processor 370, or the controller/processor 375 may be configured to perform aspects described in connection with 198 and 199 of FIG. 1.

Figure 4:
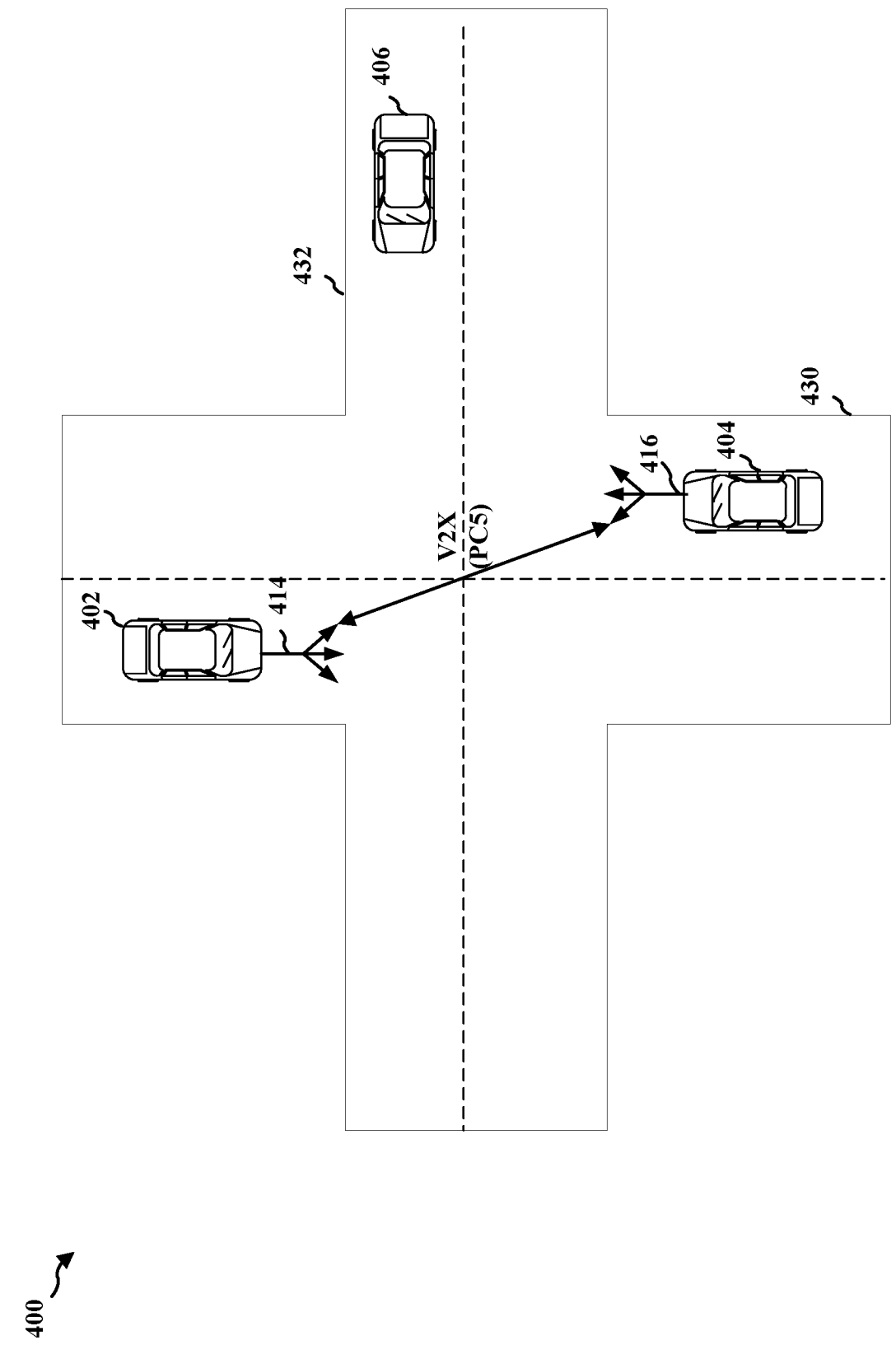
FIG. 4 is a diagram illustrating an example of wireless communication between devices at an intersection based on V2X/V2V/D2D communication according to one aspect of the present disclosure.

FIG. 4 illustrates an example 400 of wireless communication between devices based on V2X/V2V/D2D communication. The communication may be based on a slot structure comprising aspects described in connection with FIG. 2. For example, transmitting UE 402 (which may be associated with or traveling in a vehicle) may transmit a transmission 414, e.g., comprising a control channel and/or a corresponding data channel, that may be received by receiving UE 404 (which may be traveling in or associated with a vehicle). A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404 may each be capable of operating as a transmitting device in addition to operating as a receiving device. Thus, UE 404 is illustrated as transmitting a transmission 416. The transmissions 414, 416 may be broadcast or multicast to nearby devices. For example, UE 402 may transmit communication intended for receipt by other UEs within a range of UE 402.

UE 402, 404 may comprise a maneuver request component, similar to 198 described in connection with FIG. 1.

The UEs 402, 404 may be comprised in autonomous, semi-autonomous, or human-driven V2X-capable vehicles located at different parts of an intersection. In the example 400 of FIG. 4, UE 402 may be associated with or comprise an autonomous, V2X-capable vehicle located at the north side of the intersection, and UE 404 may be associated with or comprise a semi-autonomous, V2X-capable vehicle located at the south side of the intersection. When the two vehicles approach the center of the intersection, both UEs 402, 404 may transmit data to and receive data from each other in order to determine how to operate the vehicle to properly pass through the intersection. The communication between the vehicles may use a PC5 interface based on V2X communication, e.g., such as described in connection with FIG. 2. The UEs 402, 404 may share sensor information obtained at the respective vehicles. The sensor information may provide information regarding location(s) and/or speed (s) of other vehicles, planned path of the vehicles, intention of the vehicles, physical capabilities of the vehicles, detected objects or events based on the sensors, or additional information based on other sensors' input.

However, vehicle operation, at intersections or other locations, may be challenging for autonomous or semi-autonomous vehicles. Not all information might be detected by local sensors. For example, in the example 400 of FIG. 4, other vehicles, e.g., vehicle 406, may not be capable of V2X-communication. FIG. 4 illustrates non-V2X capable vehicle 406 traveling on a road 432 that will intersect with the road 430 on which UE 402 and UE 404 are traveling. Depending on the relative location of vehicle 406 relative to UE 402 and UE 404, local sensors of the vehicles associated with UE 402 and 404 may not detect the presence of vehicle 406 while UE 402 and 404 approach the intersection. As vehicle 406 is not V2X capable, vehicle 406 does not signal its presence and is not aware of the presence of the vehicles associated with UE 402 and 404 based on V2X communication. Moreover, given the existence of mixed vehicles, some cars might not be equipped with needed sensors for maneuver operation. For example, high performance sensors, such as Light Detection and Ranging (LiDAR), may be too expensive for use in many vehicles.

Moreover, even with V2X-based sensor sharing, it can be difficult to ensure safe vehicle operation. For example, even with shared sensor information from multiple vehicles, there is no guarantee that the combined sensor information is complete. For instance, if local sensors at the vehicles associated with UE 402 and 404 do not detect vehicle 406, maneuver information would be incomplete notwithstanding UE 402 and 404 sharing sensor information. Moreover, distributed autonomous driving logic may lead to unstable states. For instance, if the vehicle associated with UE 402 or UE 404 detects vehicle 406 and attempts to change their speed or direction, the change may cause a signaling storm in an attempt to reach a distributed consensus among multiple V2X capable vehicles. A change in a planned speed and/or direction to avoid a vehicle may be propagated to nearby vehicles causing the nearby vehicles to change their planned speed and/or direction. The nearby vehicles may then send their changed speed/direction to other vehicles and so forth. Additionally, powerful hardware would be needed on each vehicle to support the handling of shared sensor information and the determination of vehicle maneuvers based on such shared sensor information. Hence, there is a need for improved operation of vehicles using V2X, V2V, and/or other D2D communication. Aspects presented herein provide a solution to these problems through communication of a UE with a maneuver coordinator that provides centralized, scheduler-based vehicle handling.

Figure 5:
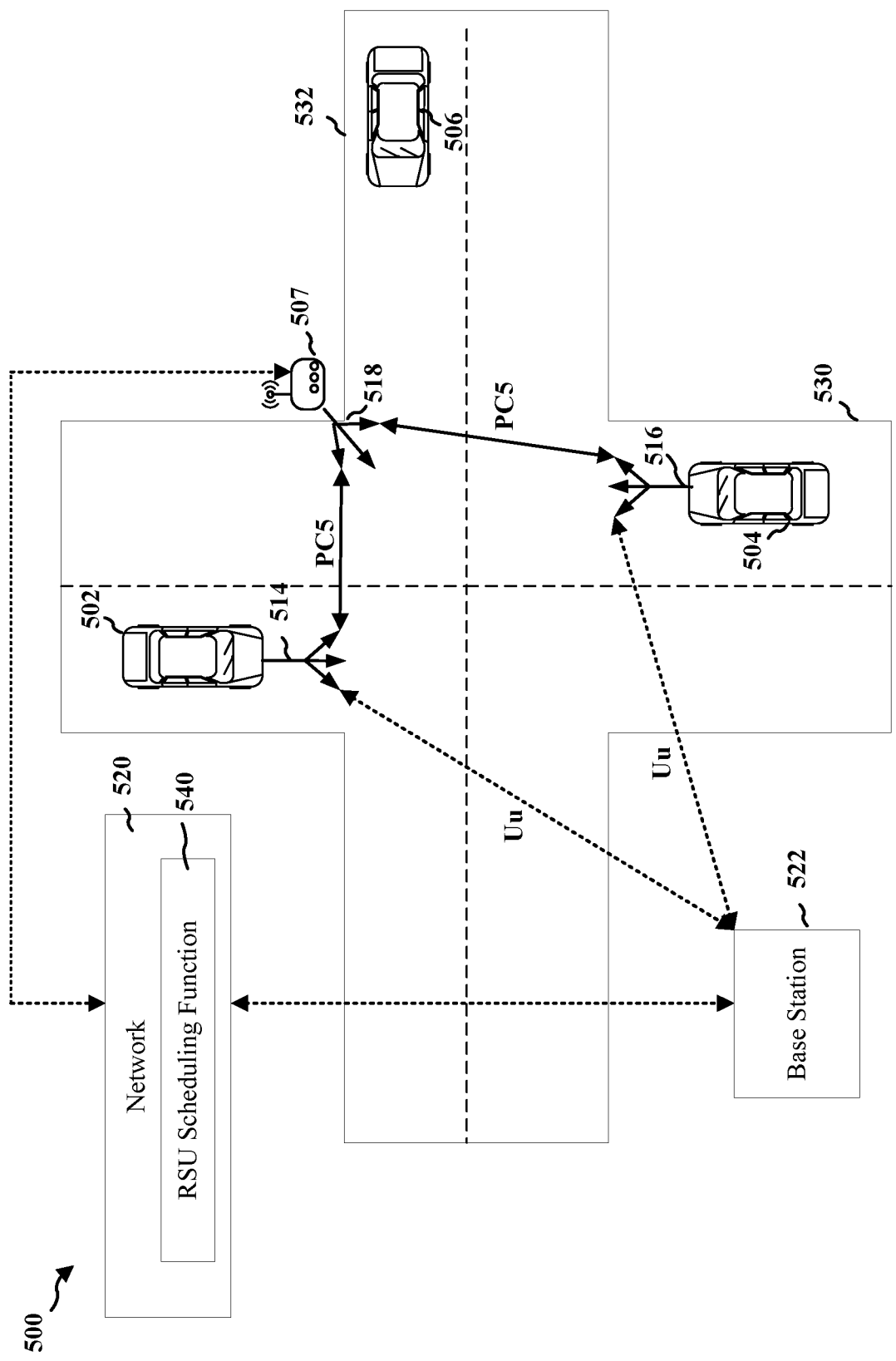
FIG. 5 is a diagram illustrating an example of wireless communication between devices at an intersection based on V2X/V2V/D2D communication according to another aspect of the present disclosure.

FIG. 5 illustrates an example 500 of wireless communication between devices based on V2X/V2V/D2D communication including centralized, scheduler-based vehicle maneuver handling. UE 502 may be similar to UE 402 in FIG. 4 and may transmit communication directly with other UEs, such as UE 504. In addition to the communication described between UEs 402, 404 in FIG. 4, V2X capable UEs 502, 504, may also communicate with a maneuver coordinator. In FIG. 5, the maneuver coordinator is illustrated as a Road Side Unit (RSU) 507 that is capable of receiving communication from multiple vehicles and providing coordinated vehicle maneuver instructions. Thus, RSU 507 may receive communication from and/or transmit communication to UEs 502, 504. For example, the RSU 507 may communicate according to one or more V2X/V2V/D2D protocols and/or use corresponding bands so that it can communicate with V2X/V2V/D2D enabled UEs. RSU 507 may comprise a maneuver coordination component, similar to 199 described in connection with FIG. 1. Although the examples of FIG. 5 uses an RSU to illustrate an example maneuver coordinator, other devices may also provide the maneuver coordination capabilities described herein. The transmissions 514, 516, 518 may be broadcast or multicast to nearby devices. In other examples, at least one of 514, 516, or 518 may be unicast.

The UEs 502, 504 may comprise a vehicle user equipment (VUE), for example. A VUE may comprise an autonomous, semi-autonomous, or human-driven V2X-capable vehicle. The UE may be located at different parts of an intersection. For instance, in the example 500 of FIG. 5, UE 502 may be associated with or comprise an autonomous, V2X-capable vehicle located at the north side of the intersection, and UE 504 may be associated with or comprise a semi-autonomous, V2X-capable vehicle located at the south side of the intersection. When UE 502 and UE 504 approach the center of the intersection, at least one of the UEs 502, 504 may transmit data to and/or receive data from the RSU 507 for assistance in maneuvering the vehicle through the intersection based on V2X communication. This arrangement allows for centralized, scheduler-based intersection handling via the RSU. Although this example is described in connection with an intersection, the aspects may be applied at various other locations, e.g., including any of freeway entrances, parking lots, entrances/exits of roadways, etc. The use of a centralized scheduling mechanism to coordinate vehicle maneuvers of V2X capable vehicles enables simplified operation logic to be used at the vehicles, because a vehicle may follow instructions from the RSU rather than determining its own maneuver. The use of a centralized scheduling mechanism also avoids potential autonomous logic conflicts, e.g., between vehicles with different OEMs. The centralized scheduling mechanism reduces the need for advanced sensors on each vehicle. Such advanced sensors may instead be incorporated into an RSU that provides the maneuver coordination. The maneuver coordinator, e.g., RSU, may be positioned in a manner that provides better visualization of the roadway or may be connected to a plurality of different sensors on or around the roadway. For example, sensors at an RSU may be located at a height above the passing vehicles. The sensors may be positioned at a side of an intersection, entrance/exit, roadway, etc. at a position that enables vehicles to be identified on multiple roadways. For example, RSU 507 may be capable of detecting vehicles on roadway 530 as well as roadway 532. In contrast, vehicles are limited to traveling the desired path. The simplification of logic requirements at the vehicles and the reduced need for advanced sensors at the vehicles lowers the cost to achieve autonomous driving vehicles, e.g., through the use of V2X assisted driving, and may also improve safety.

The UEs 502, 504 can be made aware of or otherwise identify the RSU before communicating with the RSU. As one example, a UE may identify the RSU as a maneuver coordinator using a location-based configuration. The UE may receive preconfigured information that includes locations of various maneuver coordinators. When the UE determines that it has entered a location corresponding to the location of one of the maneuver coordinators, the UE may attempt to communicate with the maneuver coordinator. As one example, a UE 502, 504 may be configured by a network, e.g., via a user plane with a base station. For example, referring to FIG. 5, RSU 507 may be directly connected to network 520, and UEs 502 and 504 may receive a configuration of locations at which the UE should use the services of a maneuver coordinator from network 520 via a base station 522 through respective Uu interfaces. The network may provide location information for multiple maneuver coordinators or may provide information identifying a particular maneuver coordinator. For example, when UE 502 and UE 504 approach the intersection where the RSU is located, the network 520 may communicate the existence of RSU 507 as a maneuver coordinator to the UEs 502, 504 over their respective Uu interfaces.

In another aspect, the UEs can be made aware of the RSU using a discovery-based configuration. In the discovery-based configuration, the UE 502 and UE 504 may listen for a broadcast or beacon from the RSU over the PC5 interface. For example, in the example of FIG. 5, RSU 507 may periodically broadcast or transmit a beacon via transmission 518. When UE 502 and UE 504 approach the intersection and receive the beacon in transmission 518, the UEs may identify the presence of the RSU as a maneuver coordinator. The beacon may distinguish the RSU that is capable of maneuver coordination from other RSUs that might not be capable of maneuver coordination. In addition to identifying the maneuver coordinator, the UE may also perform a security check to confirm that the maneuver coordinator is authorized to perform maneuver coordination. Such authorization could be based on, for example, checking the security certificate(s) associated with an announcement message from the maneuver coordinator.

Once the UE has identified the presence of the maneuver coordinator (such as RSU 507), the UE may communicate with the maneuver coordinator. The UE may send a request to the RSU for maneuver scheduling, e.g., for crossing an intersection, entering a roadway, parking, etc. In one aspect, the UE may send a request via unicast signaling over the PC5 interface. The request may include information regarding the UE's intended path and/or operation. A unicast link may be established between the UE and the RSU based on the communication from the UE. For example, referring to FIG. 5, UE 502 and/or UE 504 may request a maneuver scheduling service from the RSU 507 over the PC5 interface by sending information about the vehicle's intended path and/or operation (e.g. a first vehicle intends to proceed straight through the intersection, a second vehicle intends to turn left, etc.) using each device's established unicast link.

The RSU then schedules the vehicle's operation in the desired path. The RSU may schedule the vehicle based on communication received from multiple vehicles passing through the location and/or based on sensor information that help the RSU to detect the presence, location, and/or speed of other vehicles. The sensor information may be sensor information obtained at the RSU and/or sensor information received in report(s) from vehicle(s). In one aspect, the RSU may send instructions to the UEs, e.g., via unicast signaling, broadcast signaling, and/or multicast signaling, over the PC5. For instance, in the example of FIG. 5, the RSU may schedule UE 504 to slow down and/or stop before turning left until UE 502 finishes proceeding straight through the intersection. While the RSU transmits and receives data for coordinating maneuver scheduling, the scheduling logic can be processed remotely (e.g. using cloud computing) or locally (e.g. within the RSU itself).

The RSU can also determine scheduling using its sensors as well as reports transmitted from the UEs. For example, referring to FIG. 5, vehicle 506 is a non-V2X-capable device located at the east side of the intersection. Since vehicle 506 does not transmit and receive data based on V2X communication, the RSU includes one or more sensors (camera, radar, LiDAR, ultrasound, or the like) to detect and predict the maneuvering of vehicle 506 as it approaches the center of the intersection.

In some examples, the request to the RSU for maneuver scheduling may be sent by an upper layer of the UE, such as an application layer or a mid-ware layer (for instance, a network layer or access layer) of the UE. The request may also be sent in a message, such as a basic safety message (e.g. a BasicSafetyMessage or other name), or other message format defined under the Society of Automotive Engineers (SAE), SAE-China (C-SAE), China Communications Standards Association (CCSA) and/or cooperative Intelligent Transport Systems (C-ITS), for instance. Similarly, the data from the RSU for coordinating maneuver scheduling may be received by an upper layer of the UE, such as the application layer or mid-ware layer of the UE. The data from the RSU may also be received in a message, such as a signal phase and timing/map message (e.g. a SPaT/MAP or other name), or other message format defined under the SAE, C-SAE, CCSA, and/or C-ITS, for instance. In one example, a signature or other field identifying a certificate associated with a scheduling operation application, e.g. a specific Provider Service Identifier (PSID) or Intelligent Transportation Systems Application Identifier (ITS-AID), may be received by an upper layer of the UE for the UE to perform a security check of the RSU. Other communications between the UEs and RSU, such as those described in the signaling sequences below with respect to FIGS. 6 and 7, may be performed by the upper layers of the UEs.

Figure 6:
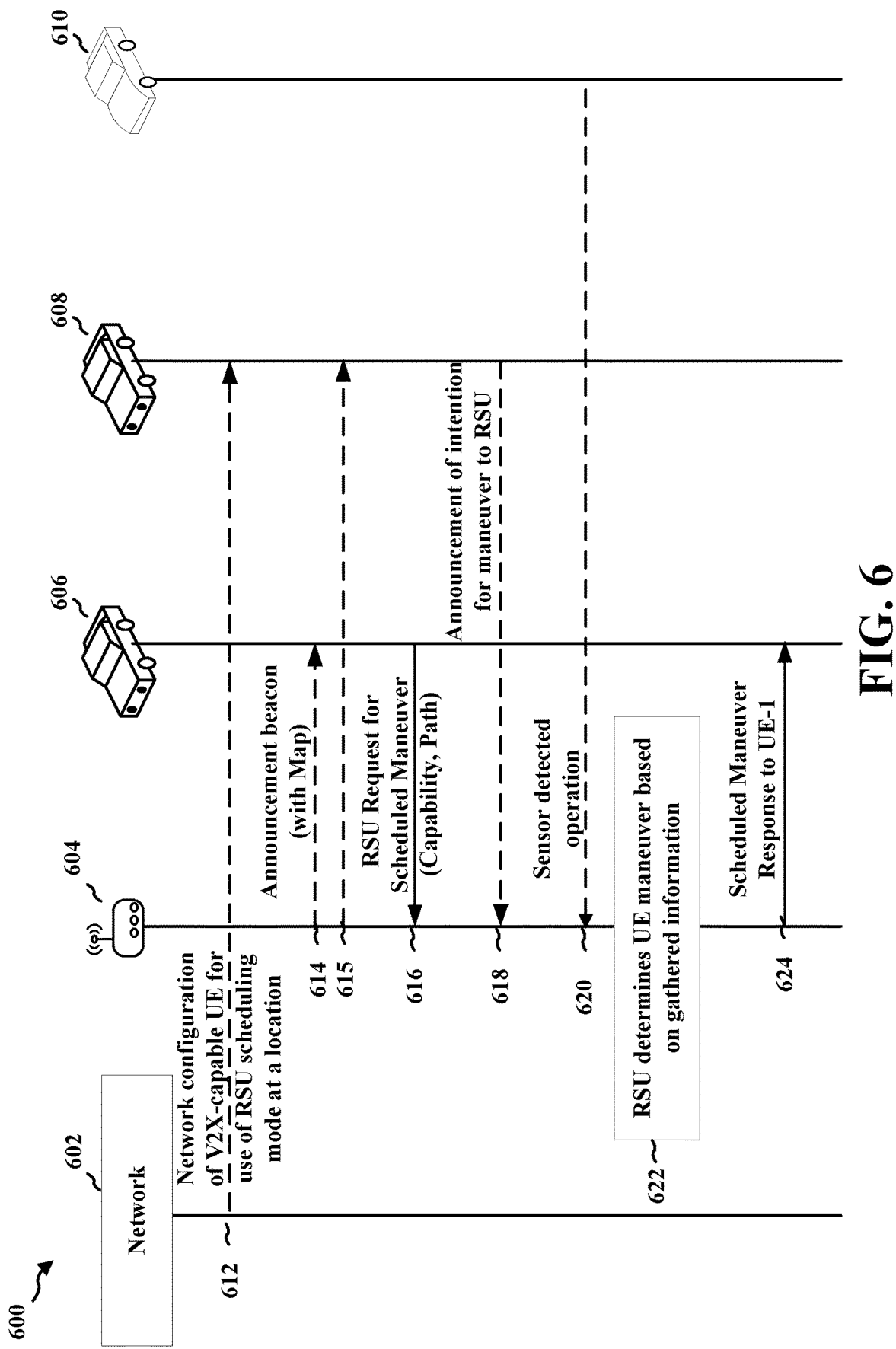
FIG. 6 is a diagram of an example communication flow between a maneuver coordinator and UEs located within range of the maneuver coordinator according to one aspect of the present disclosure.

FIG. 6 illustrates an example communication flow 600 between an RSU 604 operating as a maneuver coordinator and UEs 606, 608 and vehicle 610 located within range of the RSU. Although the maneuver coordinator is illustrated as an RSU, other devices may also perform the maneuver coordination. The communication may be based on V2X, V2V, or other D2D based communication directly between the RSU and UEs. In one aspect, FIG. 6 identifies the signaling sequence for the centralized scheduler-based intersection handling described in connection with FIG. 5, where the UEs include a first V2X-capable UE 606 (e.g. that may be associated with a vehicle or may comprise a vehicle), a second V2X-capable UE 608 (e.g. that may be associated with a vehicle or may comprise a vehicle), and a non-V2X-capable vehicle 610.

In one aspect, a network 602 may optionally configure one or more V2X-capable UEs (e.g., UE 606, 608) for use of a coordinated scheduling mode by transmitting a configuration 612. The network 602 may configure the UEs (e.g., UE 606 and 608) to use the coordinated scheduling mode when the UE is within a range of a particular location. Thus, the UEs 606 and 608 may identify the maneuver coordinator, e.g., RSU 604, based on a current location of the UE in combination with the information from configuration 612. For example, referring to FIG. 6, the network 602 may configure UE 608 to use RSU scheduling when UE 608 enters the intersection where the RSU 604 is located. The RSU 604 may be permanently mounted or may comprise a mobile RSU. For instance, the network 602 may be the EPC, and the RSU scheduling may be included in the V2X Configuration transmitted from the EPC's V2X Control Function. As another example, the network 602 may be another type of Core Network, e.g., a 5G based core network, and the configuration 612 may be transmitted from the Core Network's Policy Control Function (PCF) over the control plane using Non-access stratum (NAS) layer signaling. As another example, the configuration may be stored in a component of the UE (e.g. a subscriber identity module (SIM) or universal SIM (USIM) card, or an embedded SIM (eSIM)), or in the UE itself.

The configuration 612 may also be sent from a V2X application server outside of the EPC or Core Network. For example, referring to FIG. 6, the manufacturer of UE 606 may preconfigure the UE for V2X operation and RSU scheduling by running the V2X application server prior to the UE 606 entering a location such as an intersection. Therefore, as illustrated in FIG. 6 in one aspect, the network 602 may not transmit RSU scheduling configuration to UE 606, but may transmit RSU scheduling configuration to UE 608.

In another aspect, the RSU 604 may optionally announce its existence and/or capability of performing scheduling for vehicle maneuvers to the V2X-capable UEs. For example, as illustrated in FIG. 6, the RSU 604 may transmit an announcement (e.g. transmission 614 and/or 615). The RSU 604 may broadcast a transmission or beacon, e.g. using a special system information block (SIB) or periodical service announcement message, to monitoring V2X-capable UE 606 and UE 608 in the intersection within range of the RSU. When the UEs 606 and 608 receive the transmission 614, 615, they can identify the presence of the RSU and/or the RSU's maneuver scheduling capabilities.

The beacon or transmission 614, 615 may include a high-definition (HD) local map to assist the UEs 606 and 608 in providing information about their desired operation. For example, the HD local map may provide information about the intersection illustrated in FIG. 5 in which the RSU 507 is located. As the RSU may provide maneuver scheduling at locations other than intersections, the map may provide information for roadway entrances/exits, parking lots, etc.

In one aspect, when a UE becomes aware of the RSU through the configuration 612 and/or announcement (e.g., transmission 614, 615), the UE may confirm the RSU's authority to perform maneuver scheduling by performing a security check. The UE may perform the security check prior to requesting a scheduling service from the RSU. This security check may help to ensure that the RSU is authorized to perform maneuver operation scheduling. For example, when UE 606 or UE 608 receive the transmission 614 or 615 from the RSU 604, the transmission may include a signature or other field identifying a certificate associated with the scheduling operation application, e.g. a specific Provider Service Identifier (PSID) or Intelligent Transportation Systems Application Identifier (ITS-AID), which the UEs can use to confirm the RSU's existence and scheduling capabilities.

After identifying the presence of a maneuver coordinator (e.g., RSU 604) and/or performing a security check, V2X-capable UE(s) 606, 608 may send a request 616 for a scheduled maneuver to the RSU. This message, e.g., request 616, requests a service from the RSU and may include any of the corresponding UE's mechanical capabilities (e.g. vehicle type, break distance), the UE's planned path (e.g. based on the HD local map or the UE's navigation information), the UE's location, or the UE's speed. This scheduling request message may also include the necessary Access Stratum (AS) layer information to establish a unicast V2X link between the RSU and the UE, including, for example, the UE's Layer-2 Identifier (L2 ID), Transmission (Tx) Profile, and Quality of Service (QoS) level. The Tx profile may indicate how the UE can receive the RSU's maneuver commands, as discussed in detail infra.

For example, referring to FIG. 6, when UE 606 approaches the intersection where the RSU 604 is located, UE 606 may send to the RSU 604 a request for scheduled maneuver requesting service from the RSU 604. The request may indicate the UE's vehicle type, break distance, and/or other mechanical capabilities, its planned path (e.g. straight through the intersection or a turn onto a street exiting the intersection), and its location (e.g. north side of the intersection, which lane). The request may also include the UE's AS layer information for forming a unicast link with the RSU so that the UE 606 can receive the RSU's maneuver commands.

Other V2X capable UEs may optionally announce to the RSU their intention for maneuver(s) 618. For example, as illustrated in FIG. 5, UE 504 may be approaching the intersection where the RSU 507 is located around the same time as UE 502. However, UE 504 may not send a request for scheduled maneuver to the RSU 507, but may instead announce its intention for maneuver. Therefore, as illustrated in FIG. 6, around the time that UE 606 sends a request 616 for a scheduled maneuver to the RSU 604, UE 608 may announce its intention for maneuver 618 including its mechanical capabilities and planned path (e.g. UE 608 is traveling at a certain speed and intends to turn left), and the RSU 604 may monitor and receive the UE's announced information, e.g., maneuver 618. Alternatively, UE 608 may also request RSU scheduling by sending a request for scheduled maneuver to the RSU 604 similar to request 616.

The RSU 604 may also optionally detect maneuvers of non-V2X-capable UEs using sensors, e.g., as illustrated at 620. For example, as illustrated in FIG. 5, vehicle 506 may be a non-V2X-capable UE approaching the intersection where the RSU 507 is located, and therefore may not send to the RSU 507 a request for scheduled maneuver or announce an intention for maneuver. Therefore, as shown in FIG. 6, RSU may detect the maneuver (e.g. speed and path) of non-V2X-capable vehicle 610 using equipped sensors at the RSU and/or intersection, and/or using reports or sensor information received from UEs such as UE 606, 608. Such sensors may include any of, for example, camera, radar, LIDAR, road sensors, and/or traffic lights, etc. The RSU 604 may also use these sensors to collect information about the environment of the intersection.

As illustrated at 622, the RSU 604 may determine at least one maneuver for a nearby UE. The RSU 604 may provide information to the UE(s) that schedules the maneuver(s) for the UE(s). The RSU 604 may determine maneuvers for multiple UEs and may schedule the UEs to operate in a manner that enables all of the UEs to move in their desired paths in a coordinated manner. For example, with reference to FIG. 6, the RSU 604 may determine the maneuver for UE 606, e.g., UE 606 can proceed straight through the intersection after UE 608 turns left and before vehicle 610 turns right, based on the information gathered from the UEs 606, 608 and vehicle 610. The information gathered by the RSU 604 to schedule the maneuver can be based on data received from the UEs in V2X communications as well as local sensor readings. The information may also be based on remote traffic monitoring and control center commands.

After the RSU 604 determines the scheduled maneuver, the RSU 604 transmits a scheduled maneuver response 624 to the requesting UE(s) 606 and/or 608. The scheduled maneuver response 624 may be transmitted using a unicast link between the UE and the RSU 604. For example, as illustrated in FIG. 6, the RSU 604 may send a scheduled maneuver response 624 to UE 606 including a maneuver command informing the UE 606 of its scheduled maneuver (e.g. vehicle can proceed straight through the intersection after another vehicle turns left and before a third vehicle turns right). The maneuver command may list all the necessary operations the UE 606 will require for the maneuver, e.g. a duration for a determined UE speed and the time and/or location where the UE 606 can turn or change lanes. For example, the scheduled maneuver response transmitted to UE 606 may command the UE to slow down and/or stop before proceeding through the intersection until car 2 finishes turning left.

Figure 7:
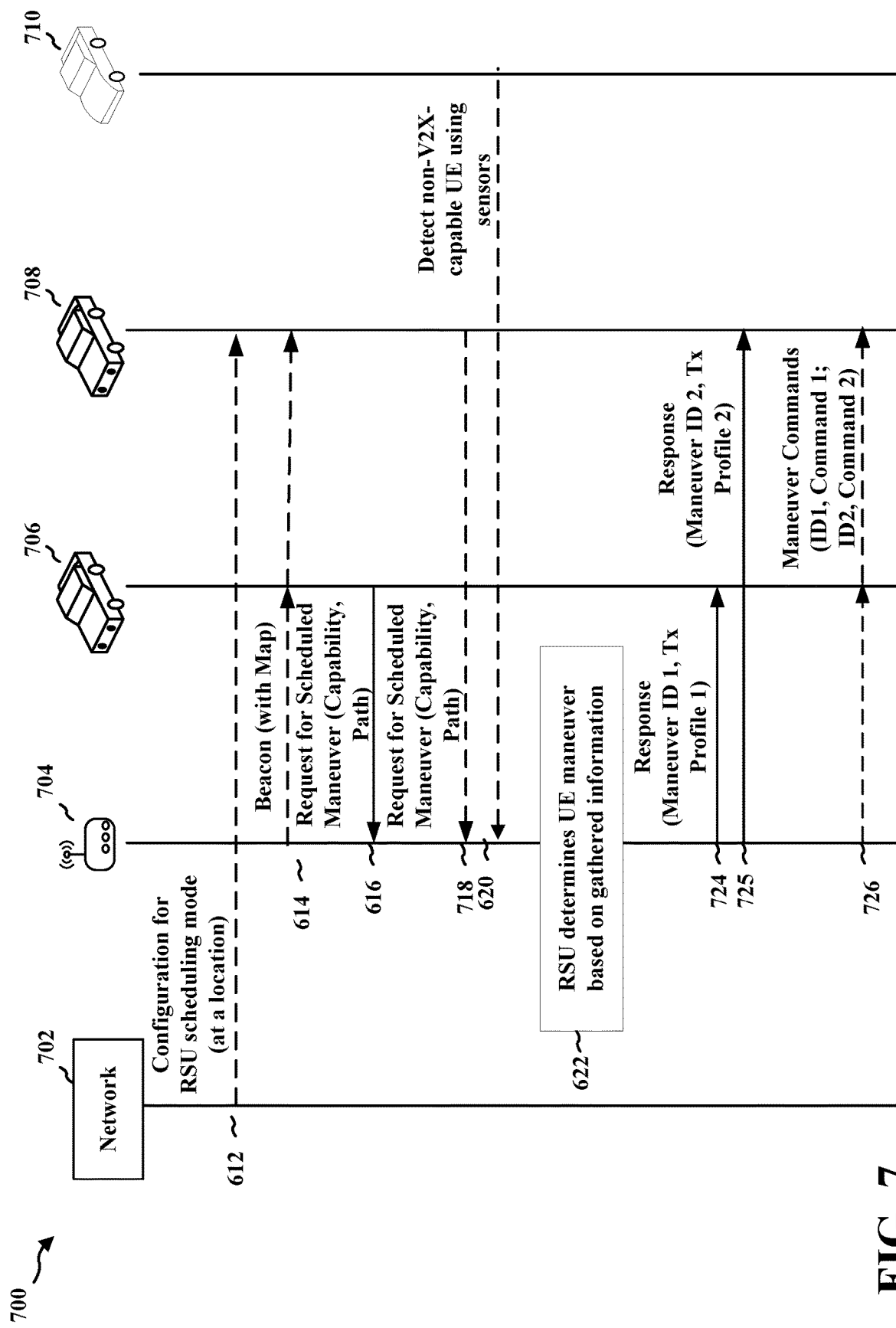
FIG. 7 is a diagram of an example communication flow between a maneuver coordinator and UEs located within range of the maneuver coordinator according to another aspect of the present disclosure.

FIG. 7 illustrates another example communication flow 700 between an RSU 704 operating as a maneuver coordinator and UEs 706, 708 and vehicle 710 located within range of the RSU 704. While the maneuver coordinator is illustrated as an RSU 704, other devices may also perform the maneuver coordination. The communication may be based on V2X, V2V, or other D2D based communication directly between the RSU and UEs. In one aspect, FIG. 7 identifies alternative aspects for the signaling sequence for the centralized scheduler-based maneuver handling described in connection with FIGS. 4, 5, and 6, where the UEs include V2X-capable UE 706 (e.g. that may be associated with a vehicle or may comprise a vehicle), V2X-capable UE 708 (e.g. that may be associated with a vehicle or may comprise a vehicle), and non-V2X-capable vehicle 710. Communication that has already been described in connection with FIG. 6 is labeled with the same reference number as in FIG. 6.

Whereas FIG. 6 illustrated UE 608 providing an announcement of its intended maneuver, UE 708 may send a request 718 for scheduled maneuver to the RSU 704. This request may be similar to that described with respect to request 616 in FIG. 6. Thus, in FIG. 7, multiple UEs send requests for maneuver scheduling to the RSU 704. For example, when UE 706 approaches the intersection where the RSU 704 is located, UE 706 may send to the RSU 704 a request 616 for a scheduled maneuver requesting service from the RSU 704, and when UE 708 approaches the intersection where the RSU 704 is located, UE 708 may also send to the RSU 704 a request 718 for a scheduled maneuver requesting service from the RSU 704.

In one aspect, each request 616, 718 may inform the RSU of the corresponding UE's V2X transmission and reception capabilities, e.g., via the corresponding UE's transmission (Tx) profile. The Tx profile indicates how the respective UE can receive the RSU's maneuver commands, and can vary for different UEs. For instance, the transmission profile may include information such as, but not limited to, the UE's supported modulation schemes (e.g. 16QAM or 64QAM), supported Radio Access Technologies (RAT) (e.g. LTE or 5G), supported communication interface (e.g. PC5), and supported Multiple Input Multiple Output (MIMO) operation modes (e.g. transmit diversity). Thus, in example 700 of FIG. 7, the request 616 from UE 706 may include a Tx profile indicating that UE 706 is capable of receiving 64QAM modulated data over the PC5 interface in New Radio (NR)/5G RAT, while the request 718 from UE 708 may include a Tx profile indicating that UE 708 is capable of receiving only 16QAM modulated data over the PC5 interface in LTE/4G RAT. The request for a scheduled maneuver may also include other information as described with respect to request 616 in FIG. 6.

As described in connection with FIG. 6, the RSU 704 may determine and schedule the maneuvers of requesting vehicles at 622.

After the RSU 704 determines the scheduled maneuver, the RSU 704 transmits a scheduled maneuver response 724, 725 to the one or more requesting UEs. In FIG. 7, the RSU 704 may broadcast maneuver information to any requesting UEs, e.g., rather than sending maneuver information in unicast links directly to a particular UE. The RSU 704 may send a response 724 to UE 706 that includes a maneuver ID for UE 706 and/or a transmission profile for UE 706. The response 724 may be sent via a unicast link between the RSU 704 and the UE 706. Similarly, the RSU 704 may send a response 725 to UE 708 that includes a maneuver ID for UE 708 and/or a transmission profile for UE 708. Thus, the response(s) 724, 725 might not include a maneuver command, but may instead include information that enables each UE 706, 708 to identify maneuver commands from a broadcast/multicast transmission 726. The RSU 704 may balance the transmission/reception capabilities of all UEs requesting scheduling and may send a response informing each UE of a Tx profile and a maneuver identifier for the corresponding UE to receive a separate maneuver command. The Tx profile indicates to the UE the format the RSU 704 will use for the maneuver command transmission. The maneuver identifier allows the UE to identify maneuver commands intended for the particular UE from among multiple maneuver commands broadcast/multicast from the RSU.

For example, as illustrated in FIG. 7, the RSU 704 may send a scheduled maneuver response to UE 706 informing the UE of a Tx Profile for the maneuver command transmission based on the UE's transmission/reception capabilities received in request 616, and a unique maneuver ID for receiving a maneuver command in the transmission. Similarly, the RSU 704 may send a scheduled maneuver response to UE 708 informing the UE 708 of a Tx Profile for the maneuver command transmission based on the UE's transmission/reception capabilities received in request 718, and a unique maneuver identifier for receiving a maneuver command in the transmission.

At 726, the RSU 704 may broadcast or multicast a maneuver command intended for at least one of multiple UEs requesting maneuver scheduling. The broadcast may include an aggregation of multiple maneuver commands intended for multiple UEs requesting scheduling. Each maneuver command in the broadcast may include a corresponding identifier (i.e. Rx ID1, Rx ID2, etc.) corresponding to one of the maneuver identifiers provided to the UEs in 724, 725. Thus, the UE 706 or 708 may look for its maneuver identifier within a broadcast/multicast from the RSU. When the UE identifies the assigned maneuver ID, the UE may determine that the associated maneuver command is intended for the UE. The maneuver command may broadcast/groupcast/multicast using the Tx profile features announced to the UEs in 724/725.

For example, as illustrated in FIG. 7, the RSU 704 broadcasts a maneuver command to UE 706 and UE 708 including Rx ID1 and corresponding maneuver command 1, Rx ID2 with corresponding maneuver command 2. ID1 and ID2 correspond to the respective maneuver identifiers transmitted to UE 706 and UE 708 in 724, 725. ID 1 informs UE 706 that command 1 is for UE 706. ID 2 informs UE 708 that command 2 is for UE 708. For instance, command 1 may indicate that UE 706 should proceed straight through the intersection, e.g., at an indicated time, and command 2 may indicate that UE 708 should turn left at the intersection, e.g., at an indicated time. Since the UEs know their respective maneuver identifiers and the Tx profile for the broadcast transmission from 724, 725, UE 706 and UE 708 can receive their scheduled maneuver commands from the RSU's message.

In one aspect, the RSU 704 may send the maneuver command in different channels or transmission formats. For example, as described supra with respect to FIG. 7, a Tx profile for UE 706 may indicate that UE 706 is capable of receiving 64-QAM modulated data over the PC5 interface in New Radio (NR)/5G RAT, while a Tx profile for UE 708 may indicate that UE 708 is capable of receiving only 16-QAM modulated data over the PC5 interface in LTE/4G RAT. Therefore, the RSU 704 may divide its maneuver command message and transmit to the UEs in different channels on the PC5 interfaces (LTE and NR) with different modulation schemes. Moreover, even if the UEs could receive the maneuver command message on the same channel, the RSU 704 may nevertheless transmit in different channels to increase data reliability.

Consequently, the RSU-based scheduling mechanism described supra provides coordinated maneuvering operation for all V2X-capable vehicles in proximity to the RSU, providing numerous advantages. For example, simpler operation logic is required for autonomous vehicles, which only need to follow instructions transmitted by the RSU. Potential autonomous logic conflicts from different car original equipment manufacturers (OEMs) are thus avoided. Moreover, as only the RSU needs to be equipped with sensors for coordinating intersection handling, each car does not need advanced sensors for maneuver operation. Vehicles do not require expensive and complicated hardware, only V2X assisted driving, and therefore autonomous driving can be achieved at lower cost.

Although the above examples refer to the use of the RSU-based scheduling mechanism for UEs at an intersection, the present invention is not limited to use at an intersection. For example, the RSU can be used at highway entrances and exits to coordinate maneuvers for UEs entering or exiting a highway. Moreover, the RSU can be used at car parks (e.g. outdoor parking lots, indoor parking garages) to manage UEs maneuvering into and out of a parking space.

A stationary RSU may operate as a maneuver coordinator. As well, a mobile RSU can operate as the maneuver coordinator. For example, the mobile RSU may be a temporary command center vehicle used for special or emergency situations (e.g. accident handling or special events). The mobile RSU may also be connected to a command center for remote, human-controlled operation. As yet another example, the maneuver coordinator may be another mobile device that is authorized to perform coordinated maneuver scheduling. For example, the maneuver coordinator may comprise a mobile terminal (e.g. a UE) that may connect to the network via a Uu or wide area network (WAN) connection.

In a further example, a mobile RSU may also be authorized to perform scheduling for UE maneuvers. For example, as described supra with respect to stationary RSUs, the RSU may include a certificate associated with the scheduling operation application (e.g. a specific PSID/ITS-AID) which is transmitted to the UEs. The US may then perform a security check for this certificate information prior to the UE requesting service from the RSU.

The maneuver coordinator may also comprise a scheduling function in a different location than the stationary or mobile RSU. When the RSU transmits and receives data for coordinating maneuver scheduling, the scheduling logic can be processed remotely (e.g. using cloud computing) or locally (e.g. within the RSU itself). In one aspect where the scheduling logic is processed remotely, the scheduling function may be located in the cloud, or far away from the actual site it manages (e.g. an intersection, a trucking depot, an automated parking lot, etc.). For example, referring to FIG. 5, the RSU's scheduling function 540 may be an element within a network 520 that disseminates maneuver information through the RSU 507 to UEs 502 or 504 over the PC5 (V2X) interface. The RSU 507 may be directly connected to the scheduling function 540 as illustrated in FIG. 5, or the RSU may be connected to the scheduling function 540 via base station 522. Alternatively, the RSU's scheduling function may be an element within the RSU itself.

The maneuver coordinator may also comprise a scheduling function that allows human inputs. The stationary or mobile RSU may be connected to a command center for remote, human-controlled operation, and the information gathered by the RSU to schedule the maneuver may be based on remote traffic monitoring and control center commands. In one aspect, the scheduling can be manually controlled by human. In another aspect, the scheduling logic can be semi-automated or automated. The scheduling logic can also be performed remotely (e.g. using cloud computing) as previously described, or locally (e.g. within the RSU itself). For example, referring to FIG. 5, the RSU's scheduling function 540 may be an element within network 520 that is manually or semi-manually controlled by an operator to schedule vehicle maneuvers.

Figure 8A:
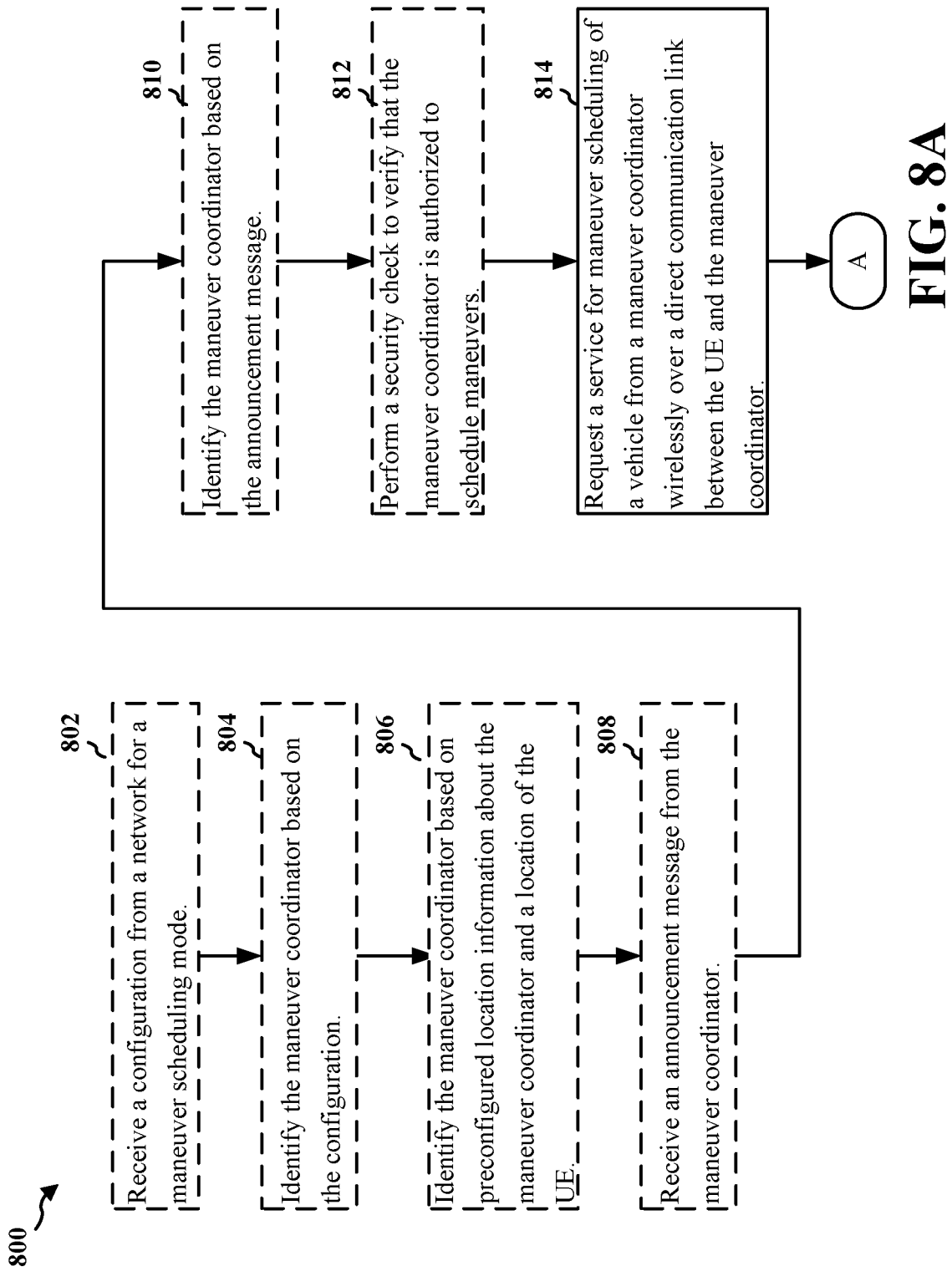
FIGS. 8A and 8B are a flowchart of a method of wireless communication at a UE.
Figure 8B:
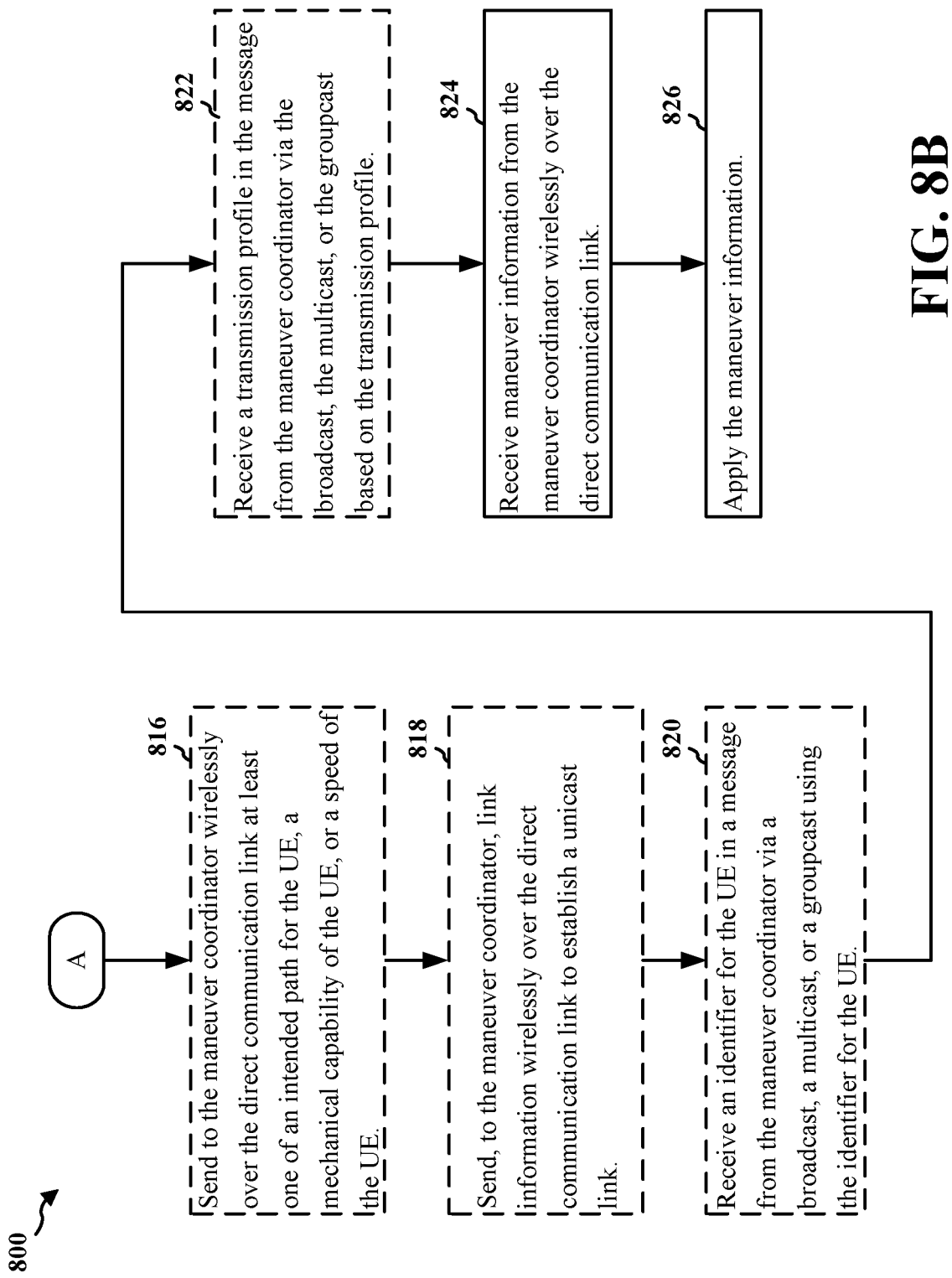

FIGS. 8A and 8B are a flowchart 800 of a method of wireless communication. The method may be performed by a UE (e.g., the UE 104, 402, 404, 502, 504, 606, 608, 706, 708, 1250, 1260; device 310, 350; the apparatus 902/902'; the processing system 1014, which may include memory and which may be an entire UE or a component of a UE) which transmits and receives data from a maneuver coordinator. The method may be performed by the UE or a component of the UE, and the component of the UE may comprise an upper layer component of the UE. For example, the method may be performed by an application layer or mid-ware layer of the UE. The maneuver coordinator may comprise a Road Side Unit (RSU) (e.g., the RSU 107, 507, 604, 704, 950) or other device (e.g., device 310 or 350). The maneuver coordinator may comprise a mobile terminal. Optional aspects are illustrated with a dashed line. The method allows the UE to receive coordinated maneuvering operation for V2X-capable vehicles in proximity to the RSU.

At 802, the UE receives a configuration from a network for a maneuver scheduling mode. For example, 802 may be performed by reception component 904 from FIG. 9. In operation according to one aspect, the UEs (e.g. V2X- capable cars) can be first made aware of the RSU using a location-based configuration. In the location-based configuration, the UEs 502, 504 may be configured by a network, e.g., over a user plane, e.g., as described in connection with 520 in FIGS. 5 and 612 in FIG. 6. For example, referring to FIG. 5, RSU 507 may be connected to network 520, and UEs 502 and 504 may be connected to network 520 via a base station 522 through respective Uu interfaces. When a UE, e.g., 502 or 504 approaches the intersection where the RSU is located, the network 520 may communicate the existence of RSU 507 to the UE 502, 504 over their respective Uu interfaces.

For instance, in LTE, the network may be the EPC, and the RSU scheduling may be included in the V2X Configuration transmitted from the EPC's V2X Control Function. As another example, in 5G, the network may be the Core Network, and the RSU scheduling configuration may be transmitted from the Core Network's Policy Control Function (PCF) over the control plane. The configuration may be stored in a component of the UE (e.g. a SIM card), or in the UE itself.

At 804, the UE may identify the maneuver coordinator based on the configuration received from the network prior to requesting the service for the maneuver scheduling. For example, 804 may be performed by identification component 910 from FIG. 9. The configuration configures the UE to use the maneuver scheduling mode based on a location of the UE. For example, in one aspect according to 612 of FIG. 6, a network 602 may optionally configure a V2X-capable UEs for use of an RSU scheduling mode, e.g., at a location, e.g., as described in connection with FIGS. 5 and/or 6. For example, referring to FIG. 6, the network 602 may configure UE 608 to use RSU scheduling when UE 608 enters a location where the RSU 604 is mounted.

At 806, the UE may identify the maneuver coordinator prior to requesting the service for the maneuver scheduling based on preconfigured location information about the maneuver coordinator and a location of the UE. For example, 806 may be performed by identification component 910 from FIG. 9. The RSU scheduling configuration may be sent from a V2X application server. For example, referring to FIG. 6, the manufacturer of UE 606 may preconfigure its UEs for V2X operation and RSU scheduling at various locations.

At 808, the UE may receive an announcement message from the maneuver coordinator, as described in connection with FIGS. 5 and 6. For example, 808 may be performed by reception component 904 from FIG. 9. For example, in one aspect, the UE can be made aware of the RSU using a discovery-based configuration. In the discovery-based configuration, the UE 502 or 504 may listen to a broadcast or beacon from the RSU over the PC5 interface. For example, in the example of FIG. 5, RSU 507 may periodically broadcast or transmit a beacon. When UE 502 or 504 monitors for transmissions approach the intersection, the UE receives the beacon and can identify the existence of the RSU.

The announcement transmission or beacon may include map information, e.g., a high-definition (HD) local map or other local map, for use in maneuver scheduling between the UE and the maneuver coordinator. For example, as shown in FIG. 6, the RSU 604's beacon being transmitted to UE 606 and UE 608 may include a HD local map identifying information about the intersection in which the RSU is located.

At 810, the UE identifies the maneuver coordinator based on the announcement message prior to requesting the service for maneuver scheduling. For example, 810 may be performed by identification component 910 from FIG. 9. The maneuver coordinator may comprise an RSU. The maneuver coordinator may comprise a scheduling function in a different location than the RSU. The maneuver coordinator may comprise a scheduling function that enables user input, e.g., human input. For example, the RSU may optionally announce its existence and capability of performing scheduling for vehicle maneuvers to the V2X-capable UEs in transmission 614. This flow is in accordance with the discovery-based configuration referenced with respect to FIG. 5. For example, as illustrated in FIG. 6, the RSU 604 announces or broadcasts a transmission or beacon to monitoring V2X-capable UE 606 and UE 608 in the intersection within range of the RSU. When the UEs 606, 608 receive the transmission, they are made aware of the RSU and its maneuver scheduling capabilities.

At 812, the UE may perform a security check to verify that the maneuver coordinator is authorized to schedule maneuvers prior to requesting the service for the maneuver scheduling. For example, 812 may be performed by verification component 912 from FIG. 9. In one aspect, when a UE becomes aware of the RSU through configuration 612 and/or transmission 614 of FIG. 6, the UE may confirm the RSU's existence and perform a security check prior to requesting scheduling service from the RSU. This security check ensures the RSU is authorized to perform maneuver operation scheduling. For example, when UE 606 or UE 608 receive the beacon transmission from the RSU 604, the transmission may include a signature or other field identifying a certificate associated with the scheduling operation application, e.g. a specific Provider Service Identifier (PSID) or Intelligent Transportation Systems Application Identifier (ITS-AID), which the UE can use to confirm the RSU's existence and scheduling capabilities.

At 814, the UE requests a service for maneuver scheduling of a vehicle from a maneuver coordinator wirelessly over a direct communication link between the UE and the maneuver coordinator. For example, 814 may be performed by request component 914 from FIG. 9. The direct communication link may be based on vehicle-to-everything (V2X) communication, and the vehicle may comprise one of an autonomous, semi-autonomous, or human driven vehicle, for example. The UE may request the service for maneuver scheduling from the maneuver coordinator for at least one of crossing an intersection, entering a road, exiting the road, parking, etc. For example, once the UE is made aware of the RSU, the UE may send a request to the RSU for intersection operation scheduling. In one aspect, the UE may send a request via unicast signaling over the PC5 interface. The request may include information regarding the UE's intended path or other operation information for the UE. A unicast link may be established between the UE and the RSU based on the request. For example, as described in connection with FIG. 5 and FIG. 6, UE 502 or 504 may request service from the RSU 507 over the PC5 interface with information about the device's intended path or operation (e.g. car 1 intends to proceed straight, car 2 intends to turn left, etc.) using each device's established unicast link.

At 816, the UE may send to the maneuver coordinator wirelessly over the direct communication link at least one of an intended path for the UE, a mechanical capability of the UE, or a speed of the UE. For example, 816 may be performed by transmission component 916 from FIG. 9. Although illustrated as separate from block 814, this information may also be comprised within block 814. For example, as described in connection with 616 of FIG. 6, one or more V2X-capable UEs may send a request for scheduled maneuver to the RSU. This message requests service from the RSU and includes the UE's mechanical capabilities (e.g. vehicle type, break distance), the UE's planned path (e.g. based on the HD local map or the UE's navigation information), and the UE's location and/or speed, etc.

At 818, the UE may send, to the maneuver coordinator, link information wirelessly over the direct communication link to establish a unicast link. For example, 818 may be performed by transmission component 916 from FIG. 9. Although illustrated as separate from block 814 and the information sent at 816, this link information may also be transmitted together with the request sent at 814 and/or information sent at 816. Maneuver information may then be received from the maneuver coordinator via the unicast link. The link information may comprise at least one of a layer 2 identifier (L2 ID), a transmission profile, a Radio Access Technology (RAT) capability, or a quality of service profile. For example, referring to FIG. 6, when UE 606 approaches the intersection where the RSU 604 is located, the UE may send to the RSU a request for scheduled maneuver requesting service from the RSU. This scheduling request message includes the necessary Access Stratum (AS) layer information to establish the unicast V2X link between the RSU and the UE, including, for example, the UE's Layer-2 Identifier (L2 ID), Transmission (Tx) Profile, and Quality of Service (QoS) level.

In one aspect, a request from the UE may inform the RSU of the UE's V2X transmission and reception capabilities via the UE's transmission (Tx) profile. The Tx profile indicates how the UE can receive the RSU's maneuver commands, and can vary for different UEs. For instance, the transmission profile may include information such as, but not limited to, the UE's supported modulation schemes (e.g. 16QAM or 64QAM), supported Radio Access Technologies (RAT) (e.g. LTE or 5G), supported communication interface (e.g. PC5), and supported Multiple Input Multiple Output (MIMO) operation modes (e.g. transmit diversity). Thus in example 700 of FIG. 7, the request from UE 706 may include a Tx profile indicating that UE 706 is capable of receiving 64QAM modulated data over the PC5 interface in New Radio (NR)/5G RAT, while the request from UE 708 may include a Tx profile indicating that UE 708 is capable of receiving only 16QAM modulated data over the PC5 interface in LTE/4G RAT. The request for scheduled maneuver may also include other information as described with respect to request 616 in FIG. 6.

At 820, the UE may receive an identifier for the UE in a message from the maneuver coordinator prior to receiving the maneuver information. For example, 820 may be performed by reception component 904 from FIG. 9. The maneuver information may be received from the maneuver coordinator via a broadcast, a multicast, or a groupcast using the identifier for the UE. For example, with reference to 724 of FIG. 7, after the RSU determines the scheduled maneuver, the RSU may transmit a scheduled maneuver response to the requesting UE. The maneuver identifier allows the UE to receive its maneuver command from the transmission.

For example, as illustrated in FIG. 7, the RSU 704 may send a scheduled maneuver response to UE 706 informing the UE of a unique maneuver identifier for receiving the UE's maneuver command in the transmission. Similarly, the RSU 704 may send a scheduled maneuver response to UE 708 informing the UE of a unique maneuver identifier for receiving the UE's maneuver command in the transmission.

At 822, the UE may receive a transmission profile in the message from the maneuver coordinator. For example, 822 may be performed by reception component 904 from FIG. 9. The maneuver information may be received from the maneuver coordinator via the broadcast, the multicast, or the groupcast based on the transmission profile. For example, with reference to response 724 of FIG. 7, after the RSU determines the scheduled maneuver, the RSU may transmit a scheduled maneuver response to the requesting UE. The Tx profile indicates to the UE the format the RSU will use for the maneuver command transmission.

For example, as illustrated in FIG. 7, the RSU 704 may send a scheduled maneuver response to UE 706 informing the UE of a Tx Profile for the maneuver command transmission based on the UE's transmission/reception capabilities received in request 616. Similarly, the RSU 704 may send a scheduled maneuver response to UE 708 informing the UE of a Tx Profile for the maneuver command transmission based on the UE's transmission/reception capabilities received in request 718.

At 824, the UE receives maneuver information from the maneuver coordinator wirelessly over the direct communication link. For example, 824 may be performed by reception component 904 from FIG. 9. For example, with reference to 624 of FIG. 6, after the RSU determines the scheduled maneuver, the RSU transmits a scheduled maneuver response to the one or more requesting UEs. For example, as illustrated in FIG. 6, the RSU 604 sends a scheduled maneuver response to UE 606 including a maneuver command informing the UE of its scheduled maneuver (e.g. car 1 can proceed straight through the intersection after car 2 turns left and before car 3 turns right). The maneuver command may list all the necessary operations the UE will require for the maneuver, e.g. a duration for a determined UE speed and the time and/or location where the UE can turn or change lanes. For example, the scheduled maneuver response transmitted to UE 606 may command the UE to slow down and/or stop before proceeding through the intersection until car 2 finishes turning left.

As another example, referring to 726 of FIG. 7, the RSU may announce an aggregated maneuver command to multiple UEs requesting scheduling. For example, as illustrated in FIG. 7, the RSU 704 broadcasts a maneuver command to UE 706 and UE 708 including Rx ID1, command 1, Rx ID2, and command 2. Rx ID1 and Rx ID2 correspond to the respective maneuver identifiers transmitted to UE 706 and UE 708 in response 724, 725. Command 1 and command 2 correspond to the respective maneuver commands informing UE 706 and UE 708 of their scheduled maneuvers determined at 622. For instance, command 1 may indicate that car 1 proceeds straight through the intersection, and command 2 may indicate that car 2 turns left at the intersection.

Finally, at 826, the UE applies the maneuver information. For example, 826 may be performed by maneuver information component 918 from FIG. 9. For example, in the maneuver command received at 624 of FIG. 6, the UE may operate a vehicle, e.g., slow down and/or stop before proceeding straight through the intersection until car 2 finishes turning left and before car 3 begins turning right, based on the maneuver command received from the maneuver coordinator.

Figure 9:
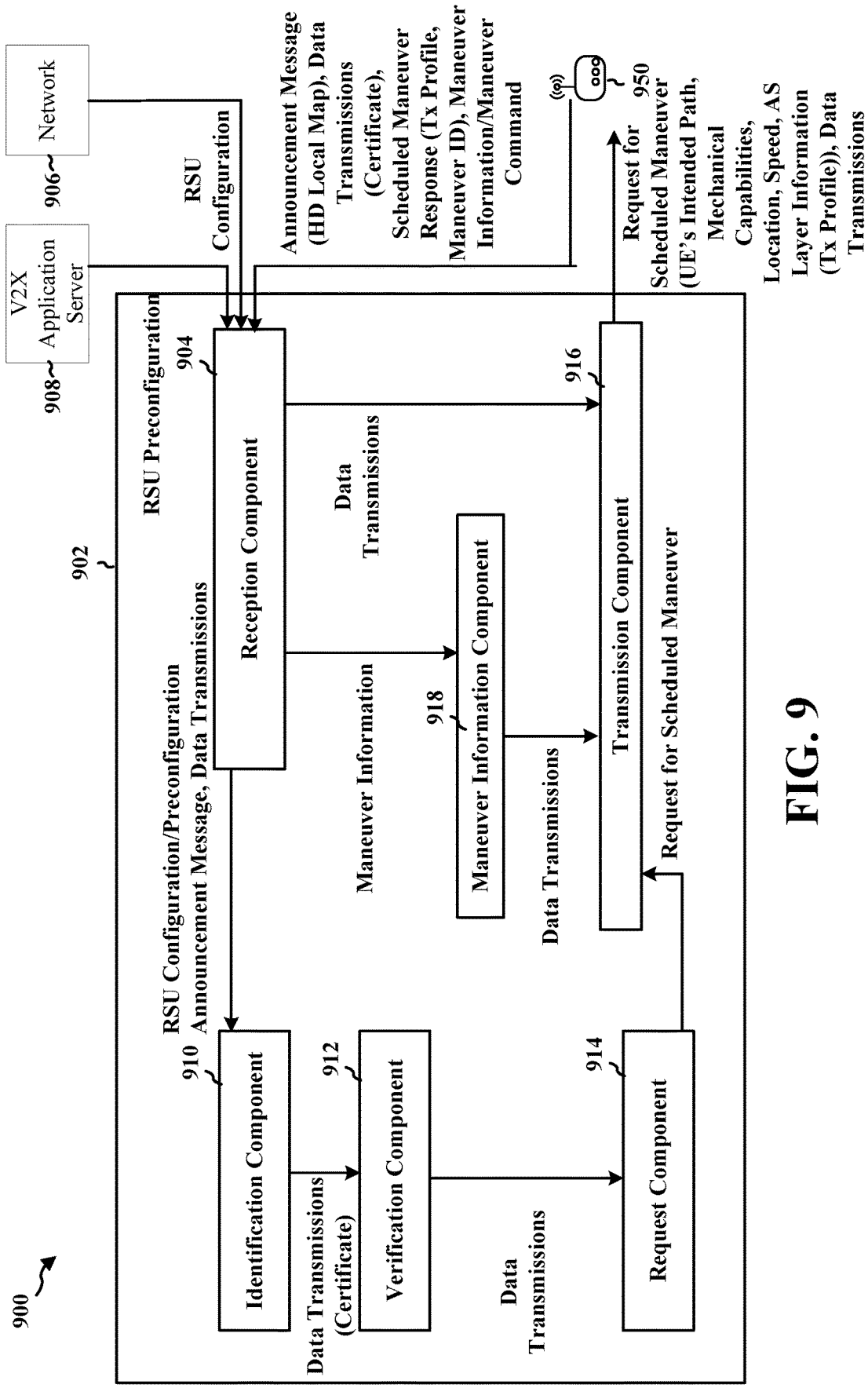
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a UE or a component of a UE. For example with reference to FIGS. 5 and 6, the UE may include V2X-capable UE (e.g., UE 104, 502, 504, 606, 608, 706, 708 or device 310, 350).

The apparatus 902 includes a reception component 904 that receives wireless communication, e.g., based on V2X, V2V, D2D, etc. The reception component may be configured to receive a configuration for a maneuver coordinator 950 from a network 906 for a maneuver scheduling mode, and/or preconfigured location information about the maneuver coordinator from a V2X application server 908. The reception component 904 also receive from a maneuver coordinator an announcement message which may include a HD local map, data transmissions which may include a certificate indicating the maneuver coordinator is authorized to perform scheduling, a message from the maneuver coordinator (i.e. scheduled maneuver response) via a broadcast, multicast or groupcast which may include an identifier for the UE (i.e. maneuver identifier) and a transmission profile (Tx Profile), and maneuver information (e.g. maneuver command).

The apparatus 902 may include an identification component 910 that identifies the maneuver coordinator 950 based on the configuration received from the network 906, based on the preconfigured location information from the V2X application server 908 and a location of the UE, and/or based on the announcement message from the maneuver coordinator 950. The apparatus 902 may further include a verification component 912 that performs a security check to verify that the maneuver coordinator is authorized to schedule maneuvers, for example based on the certificate in the received data transmissions from the maneuver coordinator.

The apparatus 902 may include a request component 914 that requests a service for maneuver scheduling of a vehicle from the maneuver coordinator 950 wirelessly over a direct communication link between the apparatus/UE and the maneuver coordinator. The apparatus 902 further includes a transmission component 916 that sends to the maneuver coordinator the request (i.e. request for scheduled maneuver) including at least one of an intended path for the UE, a mechanical capability of the UE, or a speed or location of the UE wirelessly over the direct communication link. The transmission component 916 also sends to the maneuver coordinator 950 link information (e.g. AS layer information including Tx Profile) wirelessly over the direct communication link to establish a unicast link. Moreover, the apparatus 902 includes a maneuver information component 918 that applies the maneuver information received from the maneuver coordinator.

The apparatus may include additional components that perform each of the blocks of the algorithm in the aforementioned flowcharts of FIGS. 8A and 8B. As such, each block in the aforementioned flowcharts of FIGS. 8A and 8B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
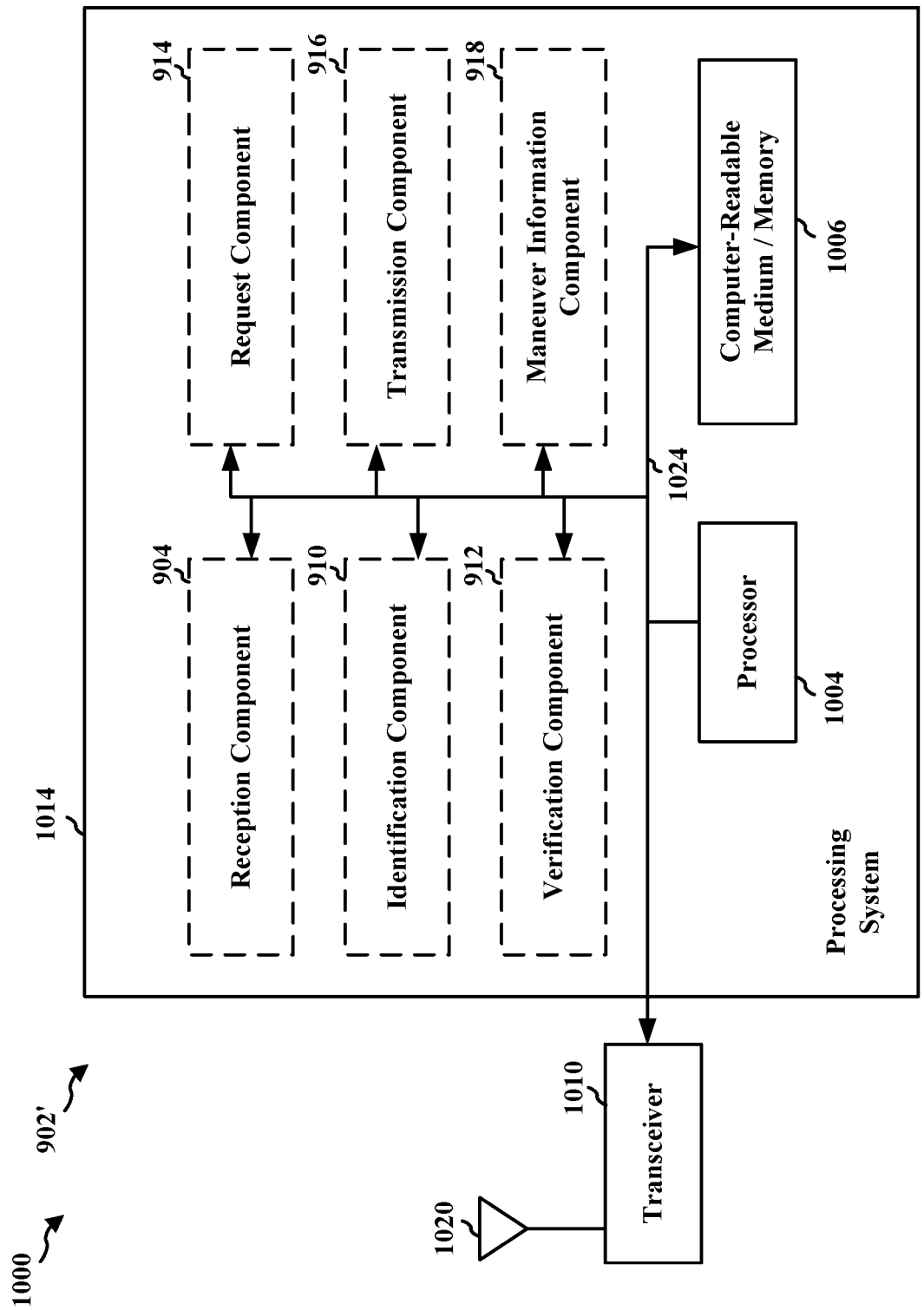
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 910, 912, 914, 916, 918 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 916, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 910, 912, 914, 916, 918. The components may be software components running in the processor 1004, resident/stored in the computer readable medium/memory 1006, one or more hardware components coupled to the processor 1004, or some combination thereof. The processing system 1014 may be a component of the device 310 or the device 350 and may include the memory 376, 360 and/or at least one of the TX processor 316, 368, the RX processor 370, 356, and the controller/processor 375, 359. Alternatively, the processing system 1014 may be the entire UE (e.g., see device 310 or 350 of FIG. 3).

In one configuration, the apparatus 902/902' for wireless communication includes means for requesting a service for maneuver scheduling of a vehicle from a maneuver coordinator wirelessly over a direct communication link between the UE and the maneuver coordinator, means for receiving maneuver information from the maneuver coordinator wirelessly over the direct communication link, and means for applying the maneuver information. In another configuration, the apparatus 902/902' for wireless communication includes means for receiving a configuration from a network for a maneuver scheduling mode, and means for identifying the maneuver coordinator based on the configuration prior to requesting the service for the maneuver scheduling. In a further configuration, the apparatus 902/902' for wireless communication includes means for receiving a configuration from a network for a maneuver scheduling mode, and means for identifying the maneuver coordinator based on the configuration prior to requesting the service for the maneuver scheduling. In yet another configuration, the apparatus 902/902' for wireless communication includes means for identifying the maneuver coordinator prior to requesting the service for the maneuver scheduling. For example, the maneuver coordinator is identified based on preconfigured location information about the maneuver coordinator and a current location of the UE. In yet a further configuration, the apparatus 902/902' for wireless communication includes means for receiving an announcement message from the maneuver coordinator, and means for identifying the maneuver coordinator based on the announcement message prior to requesting the service for maneuver scheduling.

In an additional configuration, the apparatus 902/902' for wireless communication includes means for performing a security check to verify that the maneuver coordinator is authorized to schedule maneuvers prior to requesting the service for the maneuver scheduling. In another configuration, the apparatus 902/902' for wireless communication includes means for sending to the maneuver coordinator wirelessly over the direct communication link at least one of an intended path for the UE, a mechanical capability of the UE, or a speed of the UE. In a further configuration, the apparatus 902/902' for wireless communication includes means for sending, to the maneuver coordinator, link information wirelessly over the direct communication link to establish a unicast link, the maneuver information being received from the maneuver coordinator via the unicast link. In yet another configuration, the apparatus 902/902' for wireless communication includes means for receiving an identifier for the UE in a message from the maneuver coordinator prior to receiving the maneuver information, and means for receiving a transmission profile in the message from the maneuver coordinator. For example, the maneuver information is received from the maneuver coordinator via a broadcast, a multicast, or a groupcast using the identifier for the UE and based on the transmission profile.

The aforementioned means may be one or more of the aforementioned components of the apparatus 902 and/or the processing system 1014 of the apparatus 902' configured to perform the functions recited by the aforementioned means. As described supra, the processing system 1014 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

Figure 11A:
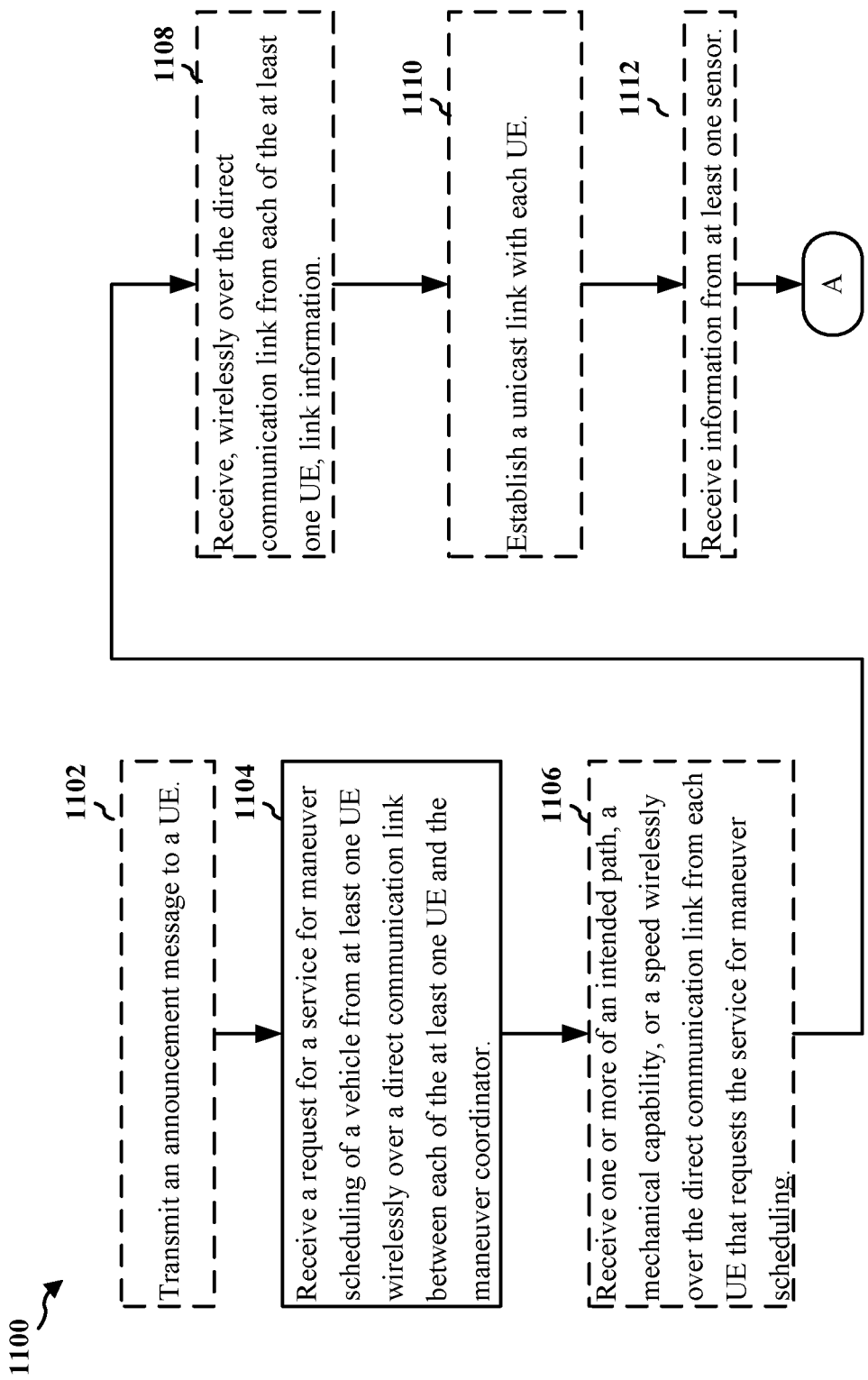
FIGS. 11A and 11B are a flowchart of a method of wireless communication at a maneuver coordinator.
Figure 11B:
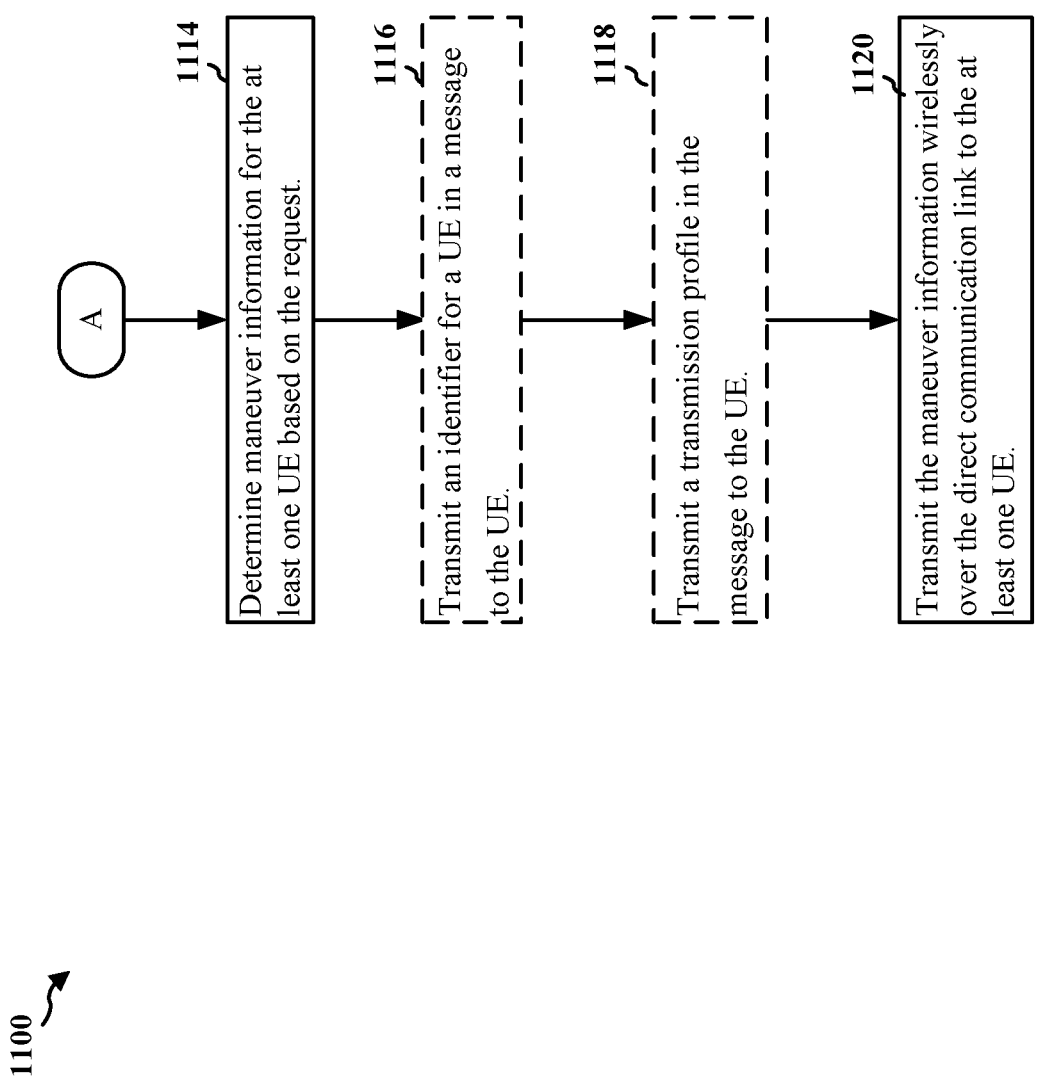

FIGS. 11A and 11B are a flowchart 1100 of a method of wireless communication. The method may be performed by a maneuver coordinator (e.g., 107, 310, 350, 507, 604, 704, 950, the apparatus 1202/1202'; the processing system 1314, which may include memory and which may be an entire maneuver coordinator or a component of the maneuver coordinator) which transmits and receives data from a UE (e.g., the UE 104, 402, 404, 502, 504, 606, 608, 610, 706, 708, 710, 1250, 1260; or device 310, 350). The maneuver coordinator may comprise a Road Side Unit (RSU). The maneuver coordinator may comprise a scheduling function in a different location than the RSU. The maneuver coordinator may comprise a scheduling function that enables user input, e.g., human input. Alternatively, the maneuver coordinator may comprise a mobile terminal. For example with reference to FIGS. 5 and 6, the UE may include V2X-capable UE 606 (e.g. UE 502 or a device associated with car 1) or V2X-capable UE 608 (e.g. UE 504 or a device associated with car 2), and the maneuver coordinator may include RSU 507/604. Optional aspects are illustrated with a dashed line. The method allows the RSU to coordinate maneuvering operation for V2X-capable vehicles in proximity to the RSU.

At 1102, the maneuver coordinator may transmit an announcement message, e.g., announcing the presence and/or capabilities of the maneuver coordinator. For example, 1102 may be performed by transmission component 1210 from FIG. 12. The announcement message may be transmitted prior to receiving the request for the service for maneuver scheduling. The announcement message may comprise an indication of a maneuver scheduling capability. The announcement message may also comprise security information that indicates that the maneuver coordinator is authorized to schedule maneuvers. For example, the RSU may optionally announce its existence and/or capability of performing scheduling for vehicle maneuvers to V2X-capable UEs, such as in transmission 614 of FIG. 6. The announcement may also include aspects described in connection with the discovery-based configuration referenced with respect to FIG. 5. For example, as illustrated in FIG. 6, the RSU 604 may announce or broadcast a transmission or beacon to monitoring V2X-capable UE 606 or UE 608 within range of the RSU. When the UEs 606, 608 receive the transmission, they can be made aware of the RSU and/or its maneuver scheduling capabilities.

Moreover, in one aspect, when the UEs become aware of the RSU through configuration 612 and/or transmission 614 of FIG. 6, they may confirm the RSU's existence and perform a security check prior to requesting scheduling service from the RSU. This security check ensures the RSU is authorized to perform maneuver operation scheduling. Thus, the beacon transmission from the maneuver coordinator at 1102 may include a signature or other field identifying a certificate associated with the scheduling operation application, e.g. a specific Provider Service Identifier (PSID) or Intelligent Transportation Systems Application Identifier (ITS-AID), which the UEs can use to confirm the maneuver coordinator's existence and scheduling capabilities.

At 1104, the maneuver coordinator receives a request for a service for maneuver scheduling of a vehicle from at least one UE. For example, 1104 may be performed by reception component 1204 from FIG. 12. The request may be received wirelessly over a direct communication link between each of the at least one UE and the maneuver coordinator, e.g., based on V2X communication. The vehicle(s) may comprise any of an autonomous, semi-autonomous, or human driven vehicles. The UE(s) may request the service for maneuver scheduling from the maneuver coordinator for at least one of crossing an intersection, entering a road, exiting the road, or parking. In one aspect, the maneuver coordinator may receive the request from the UE via unicast signaling over the PC5 interface, which includes information regarding the UE's intended path or operation, and a unicast link between the UE and the RSU is established. For example, referring to FIG. 5, UE 502 and/or 504 may request service from the RSU 507 over the PC5 interface with information about the device's intended path or operation (e.g. car 1 intends to proceed straight, car 2 intends to turn left, etc.) using each device's established unicast link.

At 1106, the maneuver coordinator may receive one or more of an intended path, a mechanical capability, or a speed wirelessly over the direct communication link from each UE that requests the service for maneuver scheduling. For instance, 1106 may be performed by reception component 1204 from FIG. 12. As an example, the maneuver coordinator of FIG. 6 is illustrated as receiving request 616. This message may request service from the maneuver coordinator and may include the UE's mechanical capabilities (e.g. vehicle type, break distance), the UE's planned path (e.g. based on a Map provided by the maneuver coordinator or the UE's navigation information), and the UE's location and/or speed.

At 1108, the maneuver coordinator may receive, wirelessly over the direct communication link from each of the at least one UE, link information. For example, 1108 may be performed by reception component 1204 from FIG. 12. The link information may comprise at least one of a layer 2 identifier (L2 ID), a transmission profile, a Radio Access Technology (RAT) capability, and/or a quality of service profile. For example, referring to FIG. 6, when UE 606 (car 1) approaches the intersection where the RSU 604 is located, maneuver coordinator, e.g., RSU 604, may receive a request for scheduled maneuver requesting service from the UE. This scheduling request message may include the necessary Access Stratum (AS) layer information to establish the unicast V2X link between the RSU and the UE, including, for example, the UE's Layer-2 Identifier (L2 ID), Transmission (Tx) Profile, and Quality of Service (QoS) level.

In one aspect, each request from a UE may inform the RSU of the UE's V2X transmission and reception capabilities via the UE's transmission (Tx) profile. The Tx profile indicates how the UE can receive the RSU's maneuver commands, and can vary for different UEs. For instance, the transmission profile may include information such as, but not limited to, the UE's supported modulation schemes (e.g. 16QAM or 64QAM), supported Radio Access Technologies (RAT) (e.g. LTE or 5G), supported communication interface (e.g. PC5), and supported Multiple Input Multiple Output (MIMO) operation modes (e.g. transmit diversity). Thus in example 700 of FIG. 7, UE-1's request may include a Tx profile indicating that UE 706 is capable of receiving 64QAM modulated data over the PC5 interface in New Radio (NR)/5G RAT, while UE-2's request may include a Tx profile indicating that UE 708 is capable of receiving only 16QAM modulated data over the PC5 interface in LTE/4G RAT. The request for scheduled maneuver may also include other information as described with respect to request 616 in FIG. 6.

At 1110, the maneuver coordinator may establish a unicast link with each of the requesting UE(s). For example, 1110 may be performed by establishing component 1206 from FIG. 12. The maneuver information may be transmitted to the UE(s) using the corresponding unicast link. For example, referring to FIG. 6, when UE 606 (car 1) approaches the intersection where the RSU 604 is located and sends to the RSU a request for scheduled maneuver requesting service from the RSU, the request may include the UE's AS layer information for forming a unicast link with the RSU so that the RSU can send the RSU's maneuver commands using an established unicast link.

At 1112, the maneuver coordinator may receive information from at least one sensor. For example, 1112 may be performed by reception component 1204 from FIG. 12. The maneuver information may then be determined based, at least in part, on the information received from the at least one sensor. In one aspect, the at least one sensor may comprise one or more of a camera, a radar, a road sensor, or a traffic light. For example, with reference to 620 of FIG. 6, the maneuver coordinator may also optionally detect maneuvers of non-V2X-capable UEs using sensors. For example, as illustrated in FIG. 5, a vehicle might not be V2X-capable and therefore might not send to the maneuver coordinator a request for scheduled maneuver or announce an intention for maneuver. Therefore, as shown in FIG. 6, the maneuver coordinator may detect the maneuver (e.g. speed and path) of non-V2X-capable vehicle 610 using equipped sensors at the maneuver coordinator and/or coupled to the maneuver coordinator. Such sensors may include, for example, camera, radar, road sensors, and/or traffic lights. The maneuver coordinator may also use these sensors to collect information about the surrounding environment.

At 1114, the maneuver coordinator determines maneuver information for the UE(s) based on the request(s). For example, 1114 may be performed by determining component 1208 from FIG. 12. For example, at 622 of FIG. 6, the maneuver coordinator determines and schedules the maneuvers of all known requesting vehicles accordingly. For example, with reference to FIG. 6, the RSU 604 may determine the maneuver for UE 606, e.g., the timing at which UE 606 can proceed straight through the intersection after UE 608 turns left and before vehicle 610 turns right, based on the information gathered from the UEs 606, 608 and vehicle 610. The information gathered by the RSU to schedule the maneuver can be based on data received from the UEs in V2X communications as well as local sensor readings. The information may also be based on remote traffic monitoring and control center commands.

In one aspect, the maneuver information may be based on information received from multiple UEs. For example, FIGS. 6 and 7 illustrate examples of multiple V2X capable UEs announcing their intention for maneuver to the maneuver coordinator and/or requesting scheduled maneuver(s). For example, as illustrated in FIG. 5, UE 504 is approaching the intersection where the RSU 507 is located around the same time as UE 502. However, UE 504 may not send a request for scheduled maneuver to the RSU, but may instead announce its intention for maneuver. Therefore, as illustrated in FIG. 6, around the time that UE-1 606 sends a request for scheduled maneuver to the RSU 604, UE-2 608 announces its intention for maneuver including its mechanical capabilities and planned path (e.g. UE 608 is traveling at a certain speed and intends to turn left), and the RSU 604 may monitor and receive announced information from UE 608. Alternatively, UE 608 may also request RSU scheduling by sending a request for scheduled maneuver to the RSU in accordance with request 616.

At 1116, the maneuver coordinator may transmit an identifier for a UE in a message prior to transmitting the maneuver information at 1120. For example, 1116 may be performed by transmission component 1210 from FIG. 12. In one aspect, the maneuver information for the UE may be transmitted, at 1120, from the maneuver coordinator via a broadcast, a multicast, or a groupcast using the identifier for the UE. For example, with reference to response 724 of FIG. 7, after the maneuver coordinator determines the scheduled maneuver, the maneuver coordinator may transmit a scheduled maneuver response to the one or more requesting UEs. In one aspect, the maneuver coordinator may balance the transmission/reception capabilities of all UEs requesting scheduling and send a response informing each UE of a Tx profile and a maneuver identifier for the UE to receive a separate maneuver command. The maneuver identifier allows the UE to receive its maneuver command from the transmission.

For example, as illustrated in FIG. 7, the RSU 704 may send a scheduled maneuver response to UE 706 informing the UE of a unique maneuver identifier for receiving the UE's maneuver command in the transmission. Similarly, the RSU 704 may send a scheduled maneuver response to UE 708 informing the UE of a unique maneuver identifier for receiving the UE's maneuver command in the transmission.

At 1118, the maneuver coordinator may transmit a transmission profile in the message from the maneuver coordinator. For example, 1118 may be performed by transmission component 1210 from FIG. 12. In one aspect, the maneuver information may be transmitted from the maneuver coordinator via the broadcast, the multicast, or the groupcast based on the transmission profile. For example, with reference to response 724 of FIG. 7, after the maneuver coordinator determines the scheduled maneuver, the maneuver coordinator transmits a scheduled maneuver response to the one or more requesting UEs. In one aspect, the maneuver coordinator may balance the transmission/reception capabilities of multiple UEs requesting scheduling and send a response informing each UE of a Tx profile and a maneuver identifier for the UE to receive a separate maneuver command. The Tx profile may indicate to the UE the format the RSU will use for the maneuver command transmission.

For example, as illustrated in FIG. 7, the RSU 704 may send a scheduled maneuver response to UE 706 informing the UE of a Tx Profile for the maneuver command transmission based on the UE's transmission/reception capabilities received in request 616. Similarly, the RSU 704 may send a scheduled maneuver response to UE 708 informing the UE of a Tx Profile for the maneuver command transmission based on the UE's transmission/reception capabilities received in request 718.

Finally, at 1120, the maneuver coordinator may transmit the maneuver information, e.g., determined at 1114, wirelessly over the direct communication link to the at least one UE. For example, 1120 may be performed by transmission component 1210 from FIG. 12. For example, with reference to 624 of FIG. 6, after the RSU determines the scheduled maneuver, the RSU transmits a scheduled maneuver response to the one or more requesting UEs. For example, as illustrated in FIG. 6, the maneuver coordinator may send a scheduled maneuver response to UE 606 including a maneuver command informing the UE of its scheduled maneuver (e.g. car 1 can proceed straight through the intersection after car 2 turns left and before car 3 turns right). The maneuver command may list all the necessary operations the UE will require for the maneuver, e.g. a duration for a determined UE speed and the time and/or location where the UE can turn or change lanes. For example, the scheduled maneuver response transmitted to UE 606 may command the UE to slow down and/or stop before proceeding through the intersection until car 2 finishes turning left.

As another example, referring to transmission 726 of FIG. 7, the maneuver coordinator may announce an aggregated maneuver command to all UEs requesting scheduling. For example, as illustrated in FIG. 7, the maneuver coordinator (such as RSU 704) may broadcast a maneuver command to UE 706 and UE 708 including Rx ID1, command 1, Rx ID2, and command 2. Rx ID1 and Rx ID2 correspond to the respective maneuver identifiers transmitted to UE 706 and UE 708 in response 724, 725. Command 1 and command 2 correspond to the respective maneuver commands informing UE 706 and UE 708 of their scheduled maneuvers determined at 622. For instance, command 1 may indicate that car 1 should proceed straight through the intersection, and command 2 may indicate that car 2 should turn left at the intersection.

In one aspect, first maneuver information may be transmitted to a first UE using a first Radio Access Technology (RAT) and second maneuver information may be transmitted to a second UE using a second RAT. For example, as described supra with respect to FIG. 7, a Tx profile for UE 706 may indicate that UE 706 is capable of receiving 64-QAM modulated data over the PC5 interface in New Radio (NR)/5G RAT, while a Tx profile for UE 708 may indicate that UE 708 is capable of receiving only 16-QAM modulated data over the PC5 interface in LTE/4G RAT. Therefore, the maneuver coordinator may divide its maneuver command message and transmit to the UEs in different channels on the PC5 interfaces (e.g., LTE and NR) with different modulation schemes. Moreover, even if the UEs could receive the maneuver command message on the same channel, the RSU may nevertheless transmit in different channels to increase data reliability.

Figure 12:
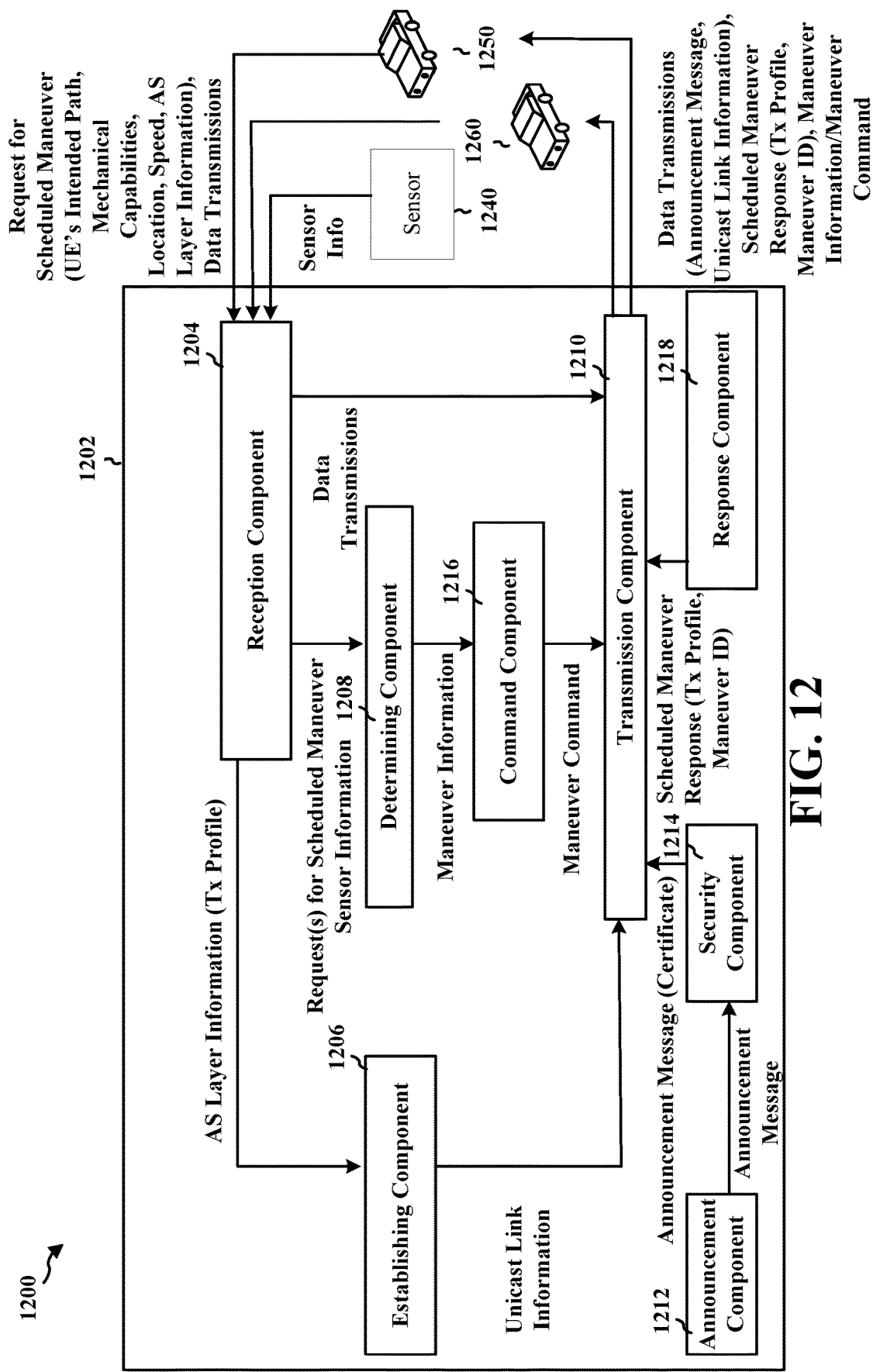
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a maneuver coordinator or a component of a maneuver coordinator (e.g. a Road Side Unit (RSU) or a mobile terminal) (e.g., 107, 310, 350, 507, 604, 704). For example with reference to FIGS. 5 and 6, the maneuver coordinator may include RSU 507/604. The maneuver coordinator may comprise a scheduling function in a different location than the RSU. The maneuver coordinator may comprise a scheduling function that enables user input, e.g., human input.

The apparatus 1202 includes a reception component 1204 that receives communication from at least one UE, e.g., based on V2X, V2V, and/or other D2D communication. The reception component may be configured to receive a request for a service for maneuver scheduling of a vehicle from UE(s) 1250, 1260 wirelessly over a direct communication link between each of the at least one UE 1250, 1260 and the maneuver coordinator (e.g. request for scheduled maneuver). The reception component 1204 receives one or more of an intended path, a mechanical capability, or a speed wirelessly over the direct communication link from each UE that requests the service for maneuver scheduling. The reception component 1204 further receives, wirelessly over the direct communication link from each of the at least one UE, link information (e.g. AS layer information including Tx Profile). The reception component 1204 additionally receives information from at least one sensor 1240, and the maneuver information is based, at least in part, on the information received from the at least one sensor.

The apparatus 1202 also includes a establishing component 1206 that establishes a unicast link with each of the at least one UE. The maneuver information is transmitted using the unicast link. The apparatus 1202 also includes a determining component 1208 that determines maneuver information (e.g. maneuver command) for the at least one UE 1250, 1260 based on the received request(s) and sensor information. Furthermore, the apparatus 1202 includes a transmission component 1210 that transmits an announcement message (e.g. a beacon) to the UEs 1250, 1260 prior to receiving the request for the service for maneuver scheduling from the UEs. The transmission component 1210 also transmits an identifier for a UE and a transmission profile in a message prior to transmitting the maneuver information. The maneuver information for the UE is transmitted from the maneuver coordinator via a broadcast, a multicast, or a groupcast using the identifier for the UE and based on the transmission profile. The transmission component 1210 sends the maneuver information wirelessly over the direct communication link to the at least one UE 1250, 1260.

The apparatus 1202 further includes an announcement component 1212 configured to transmit an announcement message of the coordinator's presence/capabilities. The apparatus 1202 also includes a security component 1214 that includes security information (e.g. a certificate) in the announcement message. Moreover, the apparatus 1202 includes a command component 1216 that sends the maneuver information determined by the determining component 1208. Furthermore, the apparatus 1202 includes a response component 1218 that sends the a maneuver ID and/or transmission profile referenced in FIG. 7.

The apparatus may include additional components that perform each of the blocks of the algorithm in the aforementioned flowcharts of FIGS. 11A and 11B. As such, each block in the aforementioned flowcharts of FIGS. 11A and 11B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
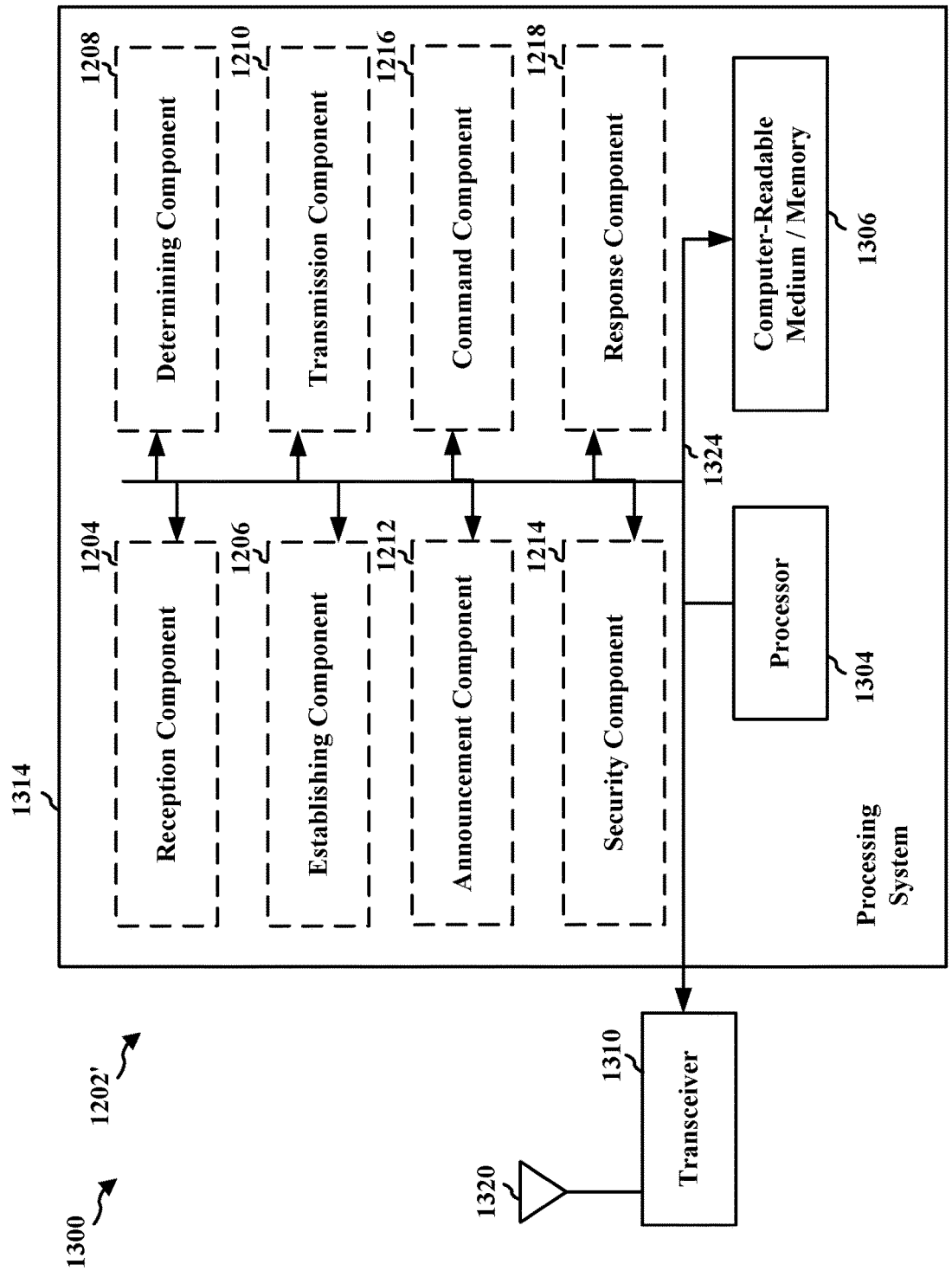
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, 1218 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218. The components may be software components running in the processor 1304, resident/stored in the computer readable medium/memory 1306, one or more hardware components coupled to the processor 1304, or some combination thereof. The processing system 1314 may be a component of the device 310 or the device 350 and may include the memory 376, 360 and/or at least one of the TX processor 316, 368, the RX processor 370, 356, and the controller/processor 375, 359. Alternatively, the processing system 1314 may be the entire maneuver coordinator (e.g., see device 310 or 350 of FIG. 3).

In one configuration, the apparatus 1202/1202' for wireless communication includes means for receiving a request for a service for maneuver scheduling of a vehicle from at least one UE wirelessly over a direct communication link between each of the at least one UE and the maneuver coordinator, means for determining maneuver information for the at least one UE based on the request, and means for transmitting the maneuver information wirelessly over the direct communication link to the at least one UE. In another configuration, the apparatus 1202/1202' for wireless communication includes means for transmitting an announcement message prior to receiving the request for the service for maneuver scheduling. In a further configuration, the apparatus 1202/1202' for wireless communication includes means for receiving one or more of an intended path, a mechanical capability, or a speed wirelessly over the direct communication link from each UE that requests the service for maneuver scheduling. In yet another configuration, the apparatus 1202/1202' for wireless communication includes means for receiving, wirelessly over the direct communication link from each of the at least one UE, link information, and means for establishing a unicast link with each of the at least one UE. In one aspect, the maneuver information is transmitted using the unicast link.

In an additional configuration, the apparatus 1202/1202' for wireless communication includes means for receiving information from at least one sensor, wherein the maneuver information is based, at least in part, on the information received from the at least one sensor. In another configuration, the apparatus 1202/1202' for wireless communication includes means for transmitting an identifier for a UE in a message prior to transmitting the maneuver information. In one aspect, the maneuver information for the UE is transmitted from the maneuver coordinator via a broadcast, a multicast, or a groupcast using the identifier for the UE. In a further configuration, the apparatus 1202/1202' for wireless communication includes means for transmitting a transmission profile in the message from the maneuver coordinator. In one aspect, the maneuver information is received from the maneuver coordinator via the broadcast, the multicast, or the groupcast based on the transmission profile.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX processor 316, 368, the RX processor 370, 356, and the controller/processor 375, 359. As such, in one configuration, the aforementioned means may be the TX processor 316, 368, the RX processor 370, 356, and the controller/processor 375, 359 configured to perform the functions recited by the aforementioned means.

It is challenging for autonomous vehicles to make determinations for vehicle maneuvers, especially at intersections. Not all traffic information might be detected by local sensors at a vehicle. Given the existence of mixed vehicles that have different communication capabilities, not all vehicles may be equipped with needed sensors and communication components to enable coordinated maneuver operations. Even with V2X-based sensor sharing among V2X capable vehicles, it may be difficult to ensure safe driving operation. For example, even with multiple vehicles, there is no guarantee that the sensor information is complete. Distributed autonomous driving logic may lead to unstable maneuver states at certain vehicles. As well, powerful hardware may be needed at each vehicle to support the handling of such shared sensor information.

The present disclosure addresses these challenges by providing for centralized, scheduler-based maneuver coordination for UEs. The UEs may transmit data to and receive data from a maneuver coordinator (e.g. a Road Side Unit) based on V2X communication. The UEs may first identify the maneuver coordinator using a location-based configuration, a discovery-based configuration, etc. Once the UE is aware of the maneuver coordinator, the UE sends a request to the maneuver coordinator for maneuver operation scheduling. The maneuver coordinator then schedules and coordinates the UE's operation. The maneuver coordinator can also determine scheduling using its sensors as well as reports transmitted from the UEs.

Consequently, the RSU-based scheduling mechanism described supra provides coordinated maneuvering operation for all V2X-capable vehicles in proximity to the RSU, providing numerous advantages. For example, simpler operation logic is required for autonomous vehicles, which only need to follow instructions transmitted by the RSU. In one aspect, the UE requests a service for maneuver scheduling of a vehicle from a maneuver coordinator wirelessly over a direct communication link between the UE and the maneuver coordinator, receives maneuver information from the maneuver coordinator wirelessly over the direct communication link, and applies the maneuver information. In another aspect, the maneuver coordinator receives a request for a service for maneuver scheduling of a vehicle from at least one User Equipment (UE) wirelessly over a direct communication link between each of the at least one UE and the maneuver coordinator, determines maneuver information for the at least one UE based on the request, and transmits the maneuver information wirelessly over the direct communication link to the at least one UE. Potential autonomous logic conflicts from different car original equipment manufacturers (OEMs) are thus avoided. Moreover, as only the RSU needs to be equipped with sensors for coordinating intersection handling, each car does not need advanced sensors for maneuver operation. Cars do not require expensive and complicated hardware, only V2X assisted driving, and therefore autonomous driving can be achieved at lower cost.

The following examples are illustrative only and may be combined with aspects of other embodiments or teaching described herein, without limitation.

Example 1 is a method of wireless communication at a User Equipment (UE), comprising: requesting a service for maneuver scheduling of a vehicle from a maneuver coordinator wirelessly over a direct communication link between the UE and the maneuver coordinator; receiving maneuver information from the maneuver coordinator wirelessly over the direct communication link; and applying the maneuver information.

In Example 2, the method of Example 1 further includes receiving a configuration from a network for a maneuver scheduling mode; and identifying the maneuver coordinator based on the configuration prior to requesting the service for the maneuver scheduling.

In Example 3, the method of Example 1 or 2 further includes that the configuration configures the UE to use the maneuver scheduling mode based on a location of the UE.

In Example 4, the method of any of Example 1-3 further includes identifying the maneuver coordinator prior to requesting the service for the maneuver scheduling, wherein the maneuver coordinator is identified based on preconfigured location information about the maneuver coordinator and a current location of the UE.

In Example 5, the method of any of Example 1-4 further includes receiving an announcement message from the maneuver coordinator; and identifying the maneuver coordinator based on the announcement message prior to requesting the service for maneuver scheduling.

In Example 6, the method of any of Example 1-5 further include performing a security check to verify that the maneuver coordinator is authorized to schedule maneuvers prior to requesting the service for the maneuver scheduling.

In Example 7, the method of any of Example 1-6 further includes sending to the maneuver coordinator wirelessly over the direct communication link at least one of an intended path for the UE, a mechanical capability of the UE, or a speed of the UE.

In Example 8, the method of any of Example 1-7 further includes sending, to the maneuver coordinator, link information wirelessly over the direct communication link to establish a unicast link, wherein the maneuver information is received from the maneuver coordinator via the unicast link.

In Example 9, the method of any of Example 1-8 further includes that the link information comprises at least one of a layer 2 identifier (L2 ID), a transmission profile, a Radio Access Technology (RAT) capability, or a quality of service profile.

In Example 10, the method of any of Example 1-9 further includes receiving an identifier for the UE in a message from the maneuver coordinator prior to receiving the maneuver information, wherein the maneuver information is received from the maneuver coordinator via a broadcast, a multicast, or a groupcast using the identifier for the UE.

In Example 11, the method of any of Example 1-10 further includes receiving a transmission profile in the message from the maneuver coordinator, wherein the maneuver information is received from the maneuver coordinator via the broadcast, the multicast, or the groupcast based on the transmission profile.

In Example 12, the method of any of Example 1-11 further includes that the UE requests the service for maneuver scheduling from the maneuver coordinator for at least one of crossing an intersection, entering a road, exiting the road, or parking.

Example 13 is a device including one or more processors and one or more memories in electronic communication with the one or more processors storing instructions executable by the one or more processors to cause the system or apparatus to implement a method as in any of Examples 1-12.

Example 14 is a system or apparatus including means for implementing a method or realizing an apparatus as in any of Examples 1-12.

Example 15 is a non-transitory computer readable medium storing instructions executable by one or more processors to cause the one or more processors to implement a method as in any of Examples 1-12.

Example 16 is a method of wireless communication at a maneuver coordinator comprising: receiving a request for a service for maneuver scheduling of a vehicle from at least one User Equipment (UE) wirelessly over a direct communication link between each of the at least one UE and the maneuver coordinator; determining maneuver information for the at least one UE based on the request; and transmitting the maneuver information wirelessly over the direct communication link to the at least one UE.

In Example 17, the method of Example 16 further includes transmitting an announcement message prior to receiving the request for the service for maneuver scheduling.

In Example 18, the method of Example 16 or Example 17 further includes that the announcement message comprises an indication of a maneuver scheduling capability.

In Example 19, the method of any of Examples 16-18 further includes that the announcement message comprises security information that indicates that the maneuver coordinator is authorized to schedule maneuvers.

In Example 20, the method of any of Examples 16-19 further includes receiving one or more of an intended path, a mechanical capability, or a speed wirelessly over the direct communication link from each UE that requests the service for maneuver scheduling.

In Example 21, the method of any of Examples 16-20 further includes receiving, wirelessly over the direct communication link from each of the at least one UE, link information; and establishing a unicast link with each of the at least one UE, wherein the maneuver information is transmitted using the unicast link.

In Example 22, the method of any of Examples 16-21 further includes that the link information comprises at least one of a layer 2 identifier (L2 ID), a transmission profile, a Radio Access Technology (RAT) capability, or a quality of service profile.

In Example 23, the method of any of Examples 16-22 further includes that the maneuver information is based on information received from multiple UEs.

In Example 24, the method of any of Examples 16-23 further includes receiving information from at least one sensor, wherein the maneuver information is based, at least in part, on the information received from the at least one sensor.

In Example 25, the method of any of Examples 16-24 further includes that the at least one sensor comprises one or more of a camera, a radar, a road sensor, or a traffic light.

In Example 26, the method of any of Examples 16-25 further includes transmitting an identifier for a UE in a message prior to transmitting the maneuver information, wherein the maneuver information for the UE is transmitted from the maneuver coordinator via a broadcast, a multicast, or a groupcast using the identifier for the UE.

In Example 27, the method of any of Examples 16-26 further includes transmitting a transmission profile in the message from the maneuver coordinator, wherein the maneuver information is received from the maneuver coordinator via the broadcast, the multicast, or the groupcast based on the transmission profile.

In Example 28, the method of any of Examples 16-27 further includes that first maneuver information is transmitted to a first UE using a first Radio Access Technology (RAT) and second maneuver information is transmitted to a second UE using a second RAT.

In Example 29, the method of any of Examples 16-28 further includes that the request the service for maneuver scheduling comprises a request for at least one of crossing an intersection, entering a road, exiting the road, or parking.

Example 30 is a device including one or more processors and one or more memories in electronic communication with the one or more processors storing instructions executable by the one or more processors to cause the system or apparatus to implement a method as in any of Examples 16-29.

Example 31 is a system or apparatus including means for implementing a method or realizing an apparatus as in any of Examples 16-29.

Example 32 is a non-transitory computer readable medium storing instructions executable by one or more processors to cause the one or more processors to implement a method as in any of Examples 16-29.

In an Example 33, for all of examples 1-32, the maneuver coordinator comprises a Road Side Unit (RSU) or a mobile terminal.

In an Example 34, for all of examples 1-33, the vehicle comprises one of an autonomous, semi-autonomous, or human driven vehicle.

In an Example 35, for all of examples 1-34, the direct communication link is based on vehicle-to-everything (V2X) communication.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   identifying a maneuver coordinator based on at least one of:
   a configuration from a network for a maneuver scheduling mode,
   preconfigured location information about the maneuver coordinator and a current location of the UE, the preconfigured location information received prior to requesting a service from the maneuver coordinator, or
   an announcement message from the maneuver coordinator, wherein the announcement message comprises at least one of an indication of a maneuver scheduling capability or security information that indicates that the maneuver coordinator is authorized to schedule maneuvers;

transmitting a sidelink message to the maneuver coordinator, the sidelink message requesting the service for maneuver scheduling of a vehicle from the maneuver coordinator wirelessly over a sidelink between the UE and the maneuver coordinator; and receiving, via the sidelink, maneuver information from the maneuver coordinator wirelessly.

2. The method of claim 1, further comprising:
receiving the configuration from the network for the maneuver scheduling mode, wherein the UE identifies the maneuver coordinator based on the configuration prior to requesting the service for the maneuver scheduling.

3. The method of claim 2, wherein the configuration configures the UE to use the maneuver scheduling mode based on the current location of the UE.

4. The method of claim 1, wherein the UE identifies the maneuver coordinator prior to requesting the service for the maneuver scheduling, the maneuver coordinator being identified based on the preconfigured location information about the maneuver coordinator and the current location of the UE.

5. The method of claim 1, further comprising:
receiving the announcement message from the maneuver coordinator, wherein the UE identifies the maneuver coordinator based on the announcement message prior to requesting the service for the maneuver scheduling.

6. The method of claim 1, further comprising:
performing a security check to verify that the maneuver coordinator is authorized to schedule maneuvers prior to requesting the service for the maneuver scheduling.

7. The method of claim 1, further comprising:
sending to the maneuver coordinator wirelessly over the sidelink at least one of an intended path for the UE, a mechanical capability of the UE, or a speed of the UE.

8. The method of claim 1, further comprising:
sending, to the maneuver coordinator, link information wirelessly over the sidelink to establish a unicast link, wherein the maneuver information is received from the maneuver coordinator via the unicast link.

9. The method of claim 8, wherein the link information comprises at least one of a layer 2 identifier (L2 ID), a transmission profile, a Radio Access Technology (RAT) capability, or a quality of service profile.

10. The method of claim 1, further comprising:
receiving an identifier for the UE in a message from the maneuver coordinator prior to receiving the maneuver information, wherein the maneuver information is received from the maneuver coordinator via a broadcast, a multicast, or a groupcast using the identifier for the UE; and
receiving a transmission profile in the message from the maneuver coordinator, wherein the maneuver information is received from the maneuver coordinator via the broadcast, the multicast, or the groupcast based on the transmission profile.

11. The method of claim 1, wherein the sidelink is based on vehicle-to-everything (V2X) communication.

12. The method of claim 1, wherein the maneuver coordinator comprises a Road Side Unit (RSU).

13. The method of claim 12, wherein the maneuver coordinator communicates with a scheduling function in a different location than the RSU.

14. The method of claim 12, wherein the maneuver coordinator comprises a scheduling function that allows user input.

15. The method of claim 1, wherein the maneuver coordinator comprises a mobile terminal.

16. An apparatus for wireless communication at a user equipment (UE), comprising:
a memory; and
at least one processor coupled to the memory and configured to:
identify a maneuver coordinator based on at least one of:
a configuration from a network for a maneuver scheduling mode,
preconfigured location information about the maneuver coordinator and a current location of the UE, the preconfigured location information received prior to requesting a service from the maneuver coordinator, or
an announcement message from the maneuver coordinator, wherein the announcement message comprises at least one of an indication of a maneuver scheduling capability or security information that indicates that the maneuver coordinator is authorized to schedule maneuvers;
transmit a sidelink message to the maneuver coordinator, the sidelink message including a request for the service for maneuver scheduling of a vehicle from the maneuver coordinator wirelessly over a sidelink between the apparatus and the maneuver coordinator; and
receive, via the sidelink, maneuver information from the maneuver coordinator wirelessly.

17. The apparatus of claim 16, wherein the at least one processor is further configured to receive the configuration from the network for the maneuver scheduling mode, identification of the maneuver coordinator being based on the configuration prior to requesting the maneuver scheduling.

18. A method of wireless communication at a maneuver coordinator comprising:
transmitting an announcement message prior to receiving a request for a service for maneuver scheduling, wherein the announcement message comprises at least one of an indication of a maneuver scheduling capability or security information that indicates that the maneuver coordinator is authorized to schedule maneuvers;
receiving a sidelink message including the request for the service for the maneuver scheduling of a vehicle from at least one User Equipment (UE) wirelessly over a sidelink between each of the at least one UE and the maneuver coordinator; and
transmitting maneuver information wirelessly over the sidelink to the at least one UE in response to the request.

19. The method of claim 18, further comprising:
receiving one or more of an intended path, a mechanical capability, or a speed wirelessly over the sidelink from each UE that requests the service for the maneuver scheduling.

20. The method of claim 18, further comprising:
receiving, wirelessly over the sidelink from each of the at least one UE, link information; and
establishing a unicast link with each of the at least one UE, wherein the maneuver information is transmitted using the unicast link.

21. The method of claim 20, wherein the link information comprises at least one of a layer 2 identifier (L2 ID), a transmission profile, a Radio Access Technology (RAT) capability, or a quality of service profile.

22. The method of claim 18, wherein the maneuver information is based on information received from multiple UEs.

23. The method of claim 18, further comprising:
receiving information from at least one sensor, wherein the maneuver information is based, at least in part, on the information received from the at least one sensor.

24. The method of claim 23, wherein the at least one sensor comprises one or more of a camera, a radar, a road sensor, or a traffic light.

25. A method of wireless communication at a maneuver coordinator comprising:
receiving a sidelink message including a request for a service for maneuver scheduling of a vehicle from at least one User Equipment (UE) wirelessly over a sidelink between each of the at least one UE and the maneuver coordinator;
transmitting maneuver information wirelessly over the sidelink to the at least one UE;
transmitting an identifier for a UE in a message prior to transmitting the maneuver information, wherein the maneuver information for the UE is transmitted from the maneuver coordinator via a broadcast, a multicast, or a groupcast using the identifier for the UE; and
transmitting a transmission profile in the message from the maneuver coordinator, wherein the maneuver information is transmitted from the maneuver coordinator via the broadcast, the multicast, or the groupcast based on the transmission profile.

26. The method of claim 18, wherein first maneuver information is transmitted to a first UE using a first Radio Access Technology (RAT) and second maneuver information is transmitted to a second UE using a second RAT.

27. An apparatus for wireless communication at a maneuver coordinator, comprising:
a memory; and
at least one processor coupled to the memory and configured to:
transmit an announcement message prior to receiving a request for a service for maneuver scheduling, wherein the announcement message comprises at least one of an indication of a maneuver scheduling capability or security information that indicates that the maneuver coordinator is authorized to schedule maneuvers;
receive a sidelink message including the request for the service for the maneuver scheduling of a vehicle from at least one User Equipment (UE) wirelessly over a sidelink between each of the at least one UE and the maneuver coordinator; and
transmit maneuver information wirelessly over the sidelink to the at least one UE in response to the request.

28. The apparatus of claim 27, wherein the at least one processor is further configured to receive one or more of an intended path, a mechanical capability, or a speed wirelessly over the sidelink from each UE that requests the service for the maneuver scheduling.

29. The method of claim 1, further comprising:
applying the maneuver information.

30. The apparatus of claim 16, wherein the at least one processor is further configured to:
apply the maneuver information.

31. The method of claim 18, further comprising:
determining the maneuver information for the at least one UE based on the request.

32. The apparatus of claim 28, wherein the at least one processor is further configured to:
determine the maneuver information for the at least one UE based on the request.

33. The apparatus of claim 27,
wherein the maneuver information is based on information received from multiple UEs.

34. An apparatus for wireless communication at a maneuver coordinator, comprising:
a memory; and
at least one processor coupled to the memory and configured to:
receive a sidelink message including a request for a service for maneuver scheduling of a vehicle from at least one User Equipment (UE) wirelessly over a sidelink between each of the at least one UE and the maneuver coordinator;
transmit maneuver information wirelessly over the sidelink to the at least one UE;
transmit an identifier for a UE in a message prior to transmitting the maneuver information, wherein the maneuver information for the UE is transmitted from the maneuver coordinator via a broadcast, a multicast, or a groupcast using the identifier for the UE; and
transmit a transmission profile in the message from the maneuver coordinator, wherein the maneuver information is transmitted from the maneuver coordinator via the broadcast, the multicast, or the groupcast based on the transmission profile.

35. An apparatus for wireless communication at a User Equipment (UE), comprising:
means for identifying a maneuver coordinator based on at least one of:
a configuration from a network for a maneuver scheduling mode,
preconfigured location information about the maneuver coordinator and a current location of the UE, the preconfigured location information received prior to requesting a service from the maneuver coordinator, or
an announcement message from the maneuver coordinator, wherein the announcement message comprises at least one of an indication of a maneuver scheduling capability or security information that indicates that the maneuver coordinator is authorized to schedule maneuvers;
means for transmitting a sidelink message to the maneuver coordinator, the sidelink message requesting the service for maneuver scheduling of a vehicle from the maneuver coordinator wirelessly over a sidelink between the UE and the maneuver coordinator; and
means for receiving, via the sidelink, maneuver information from the maneuver coordinator wirelessly.

* * * * *